Oct. 21, 1941.   R. M. HICKS ET AL   2,260,116
ELECTRICAL INDICATING SYSTEM
Filed May 24, 1930   9 Sheets-Sheet 1

Oct. 21, 1941.   R. M. HICKS ET AL   2,260,116
ELECTRICAL INDICATING SYSTEM
Filed May 24, 1930   9 Sheets-Sheet 3

Fig. 3.

INVENTORS
Raymond M. Hicks
Everett R. Leroy
BY Ward Crosby & Neal
ATTORNEYS

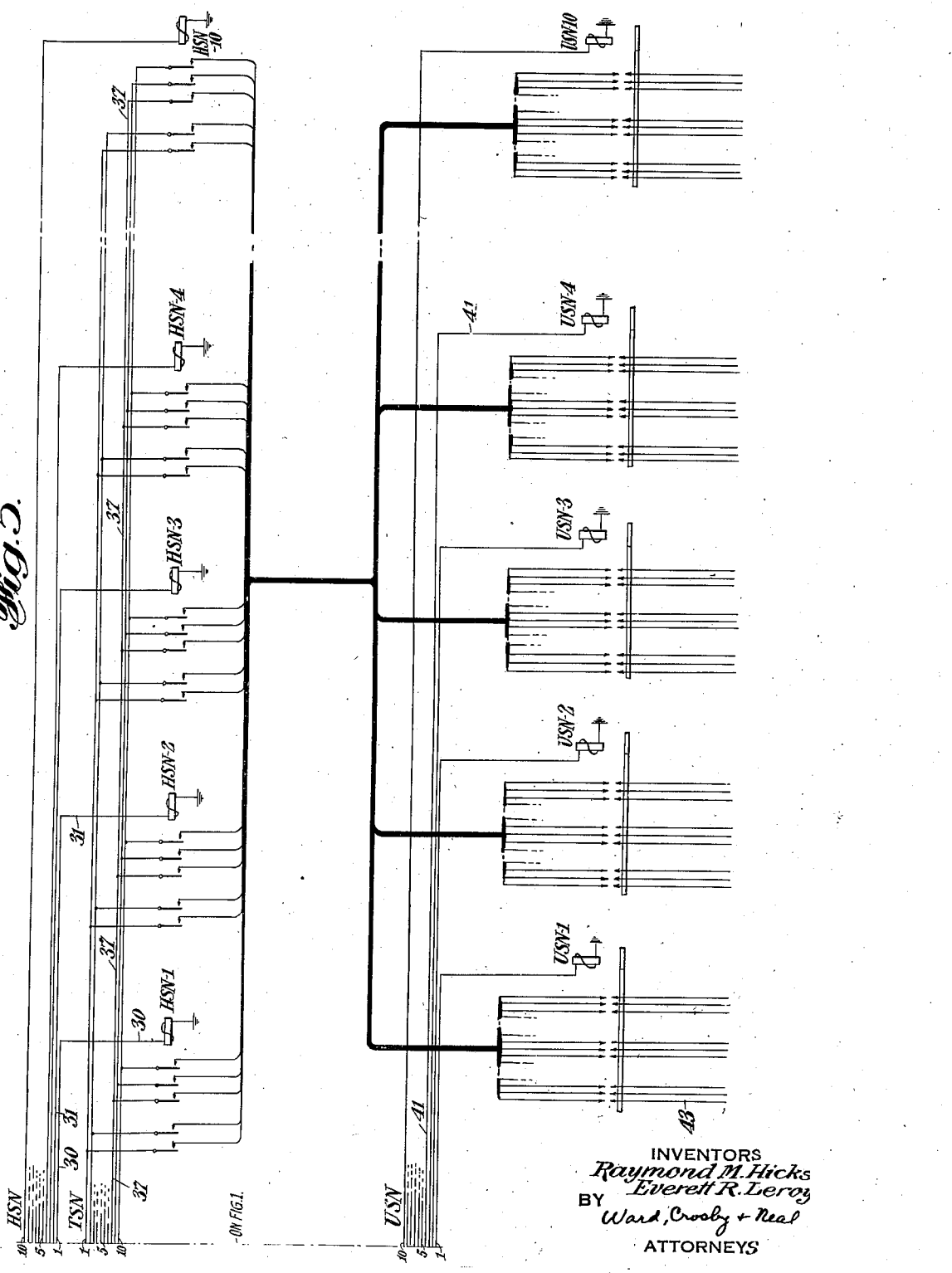

Oct. 21, 1941.   R. M. HICKS ET AL   2,260,116
ELECTRICAL INDICATING SYSTEM
Filed May 24, 1930   9 Sheets-Sheet 6
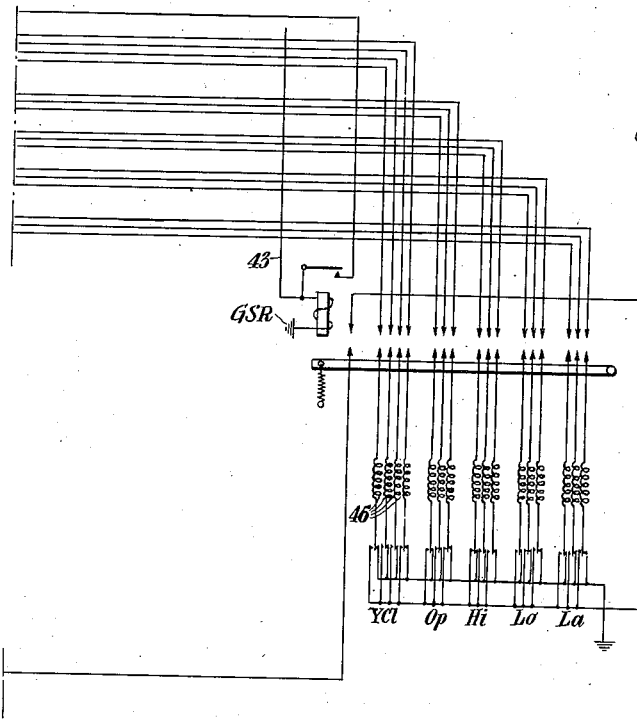
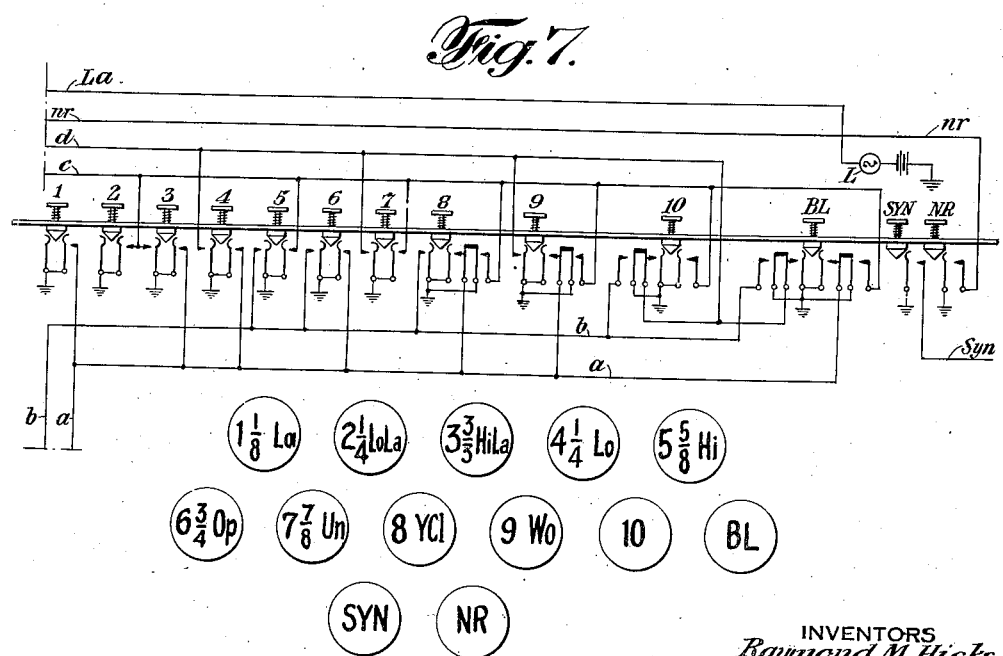
INVENTORS
Raymond M. Hicks
Everett R. Leroy
BY Ward, Crosby & Neal
ATTORNEYS

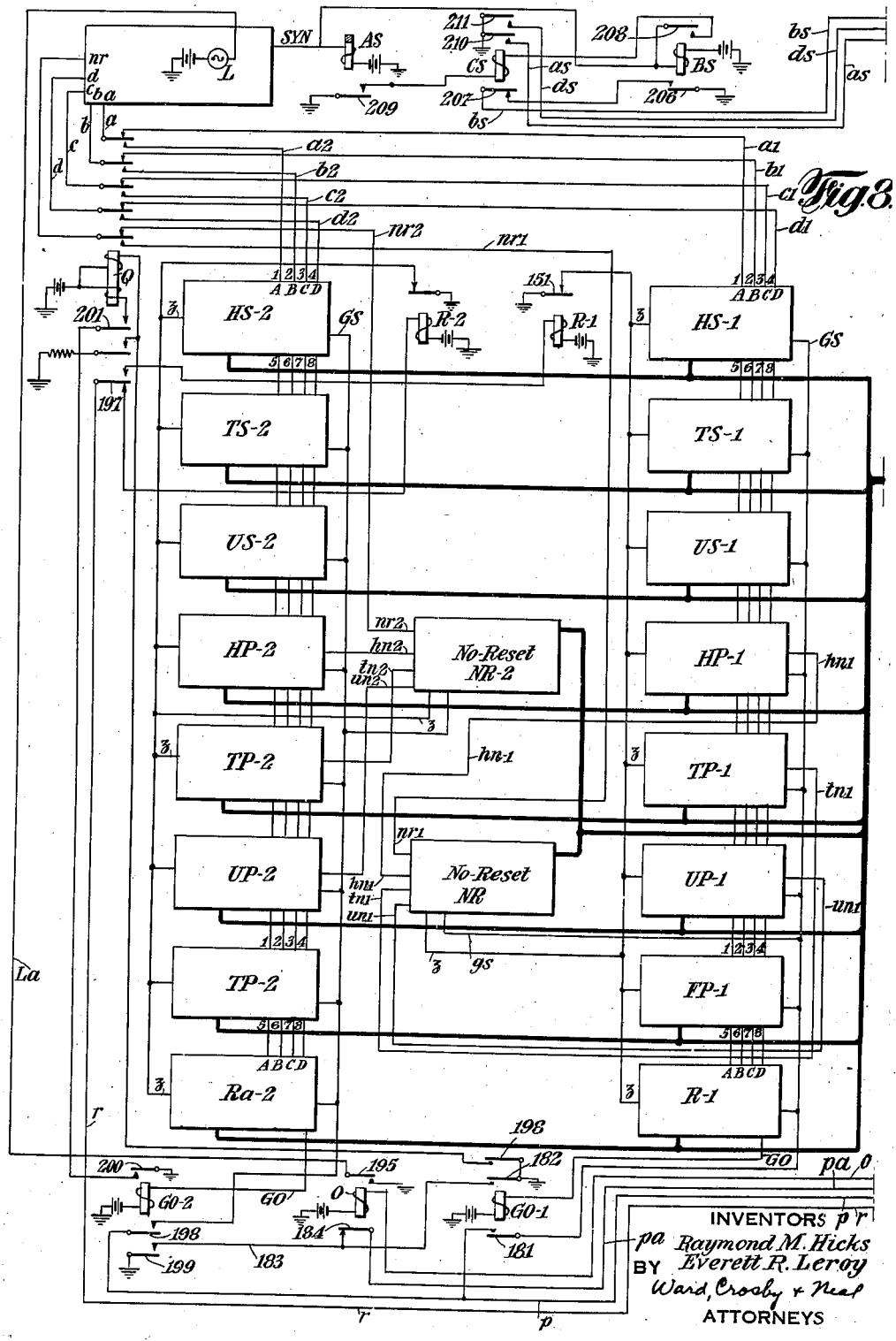

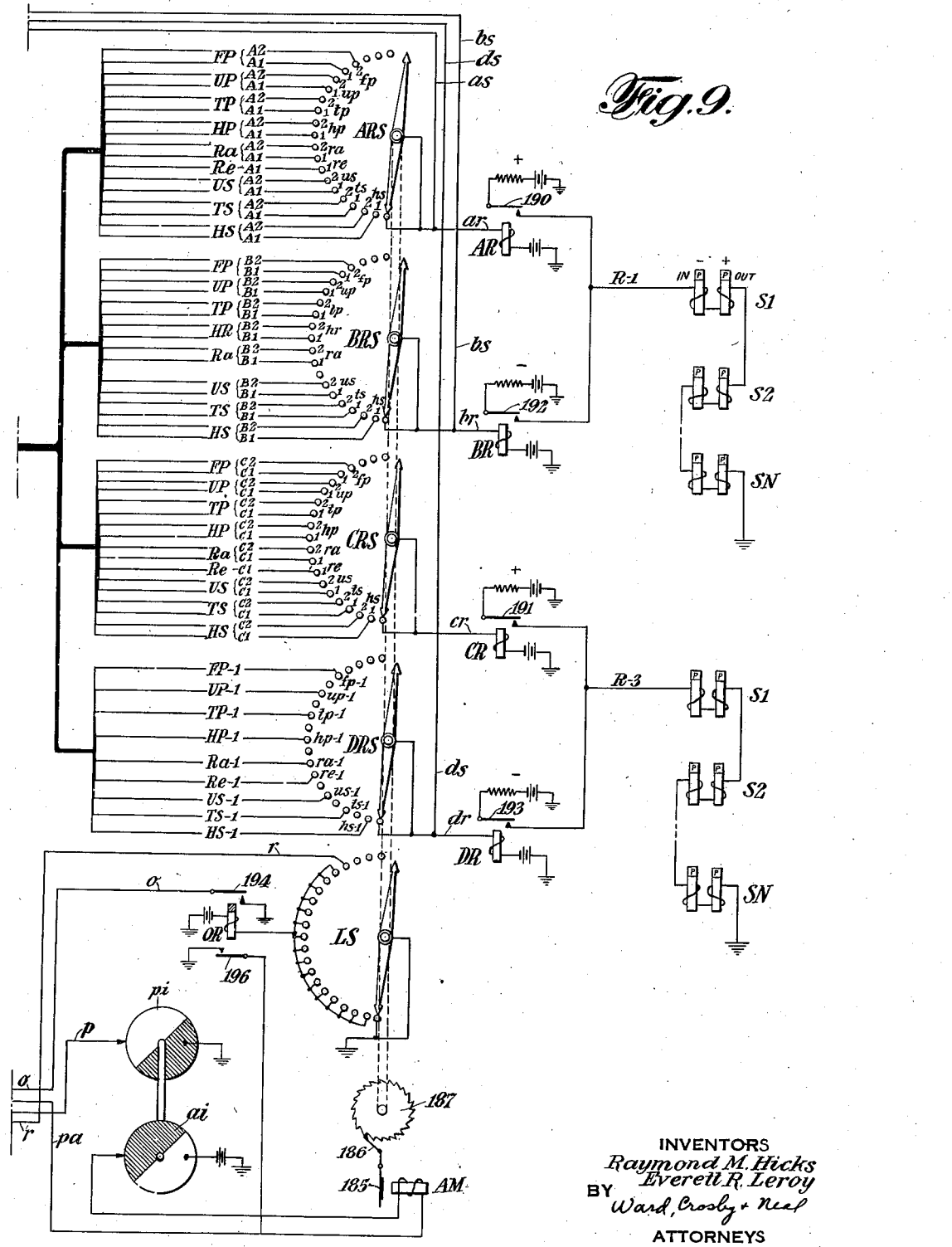

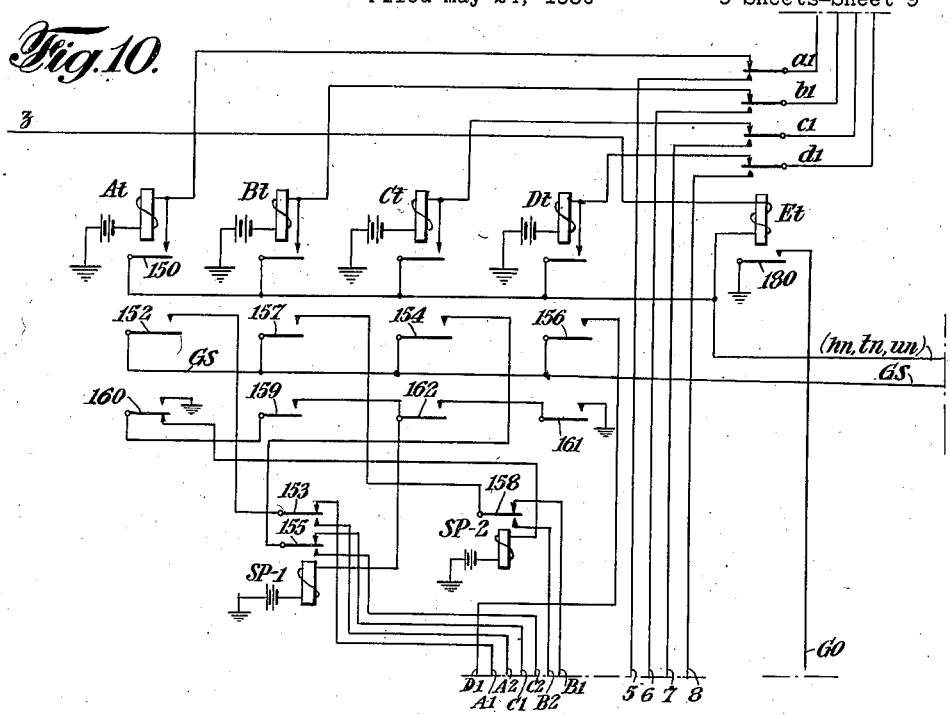
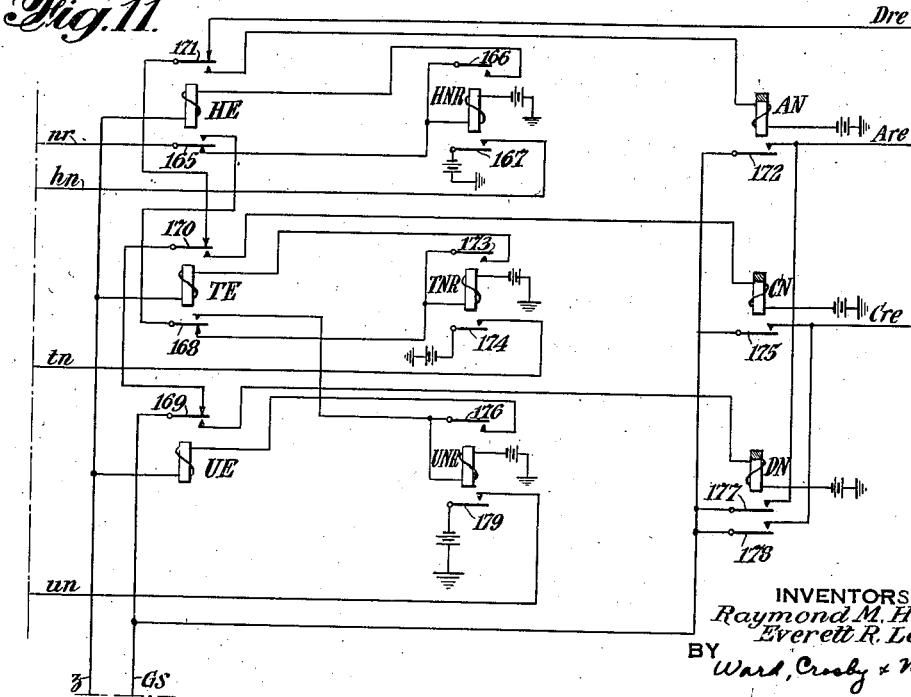

Patented Oct. 21, 1941

2,260,116

UNITED STATES PATENT OFFICE 2,260,116

ELECTRICAL INDICATING SYSTEM

Raymond M. Hicks, Larchmont, and Everett R. Leroy, New York, N. Y., assignors to The Teleregister Corporation, New York, N. Y., a corporation of Delaware Application May 24, 1930, Serial No. 455,217

8 Claims. (Cl. 177—353)

This invention relates to electrically controlled indicating systems for posting prices of stocks or other commodities.

Among the objects of this invention are the provision of improved means for controlling and operating a stock quotation board or the like comprising a large number of groups of indicator assemblies for indicating various price ranges of stocks, such means preferably including at the receiving station a stock number or group selecting means, a no-reset control means, a range or indicator assembly selecting means, price digit controlling means, all preferably adapted to be successively operated to store up information which is later to be released in the proper sequence to control the selection and operation of any indicator or indicators within any price range or ranges in any group of indicators relating to any stock of which the price or prices are to be quoted; to provide storage mechanisms that may be controlled over a small number of transmission channels connecting the receiving station with a transmitting station; to provide storage mechanisms responsive to code pulses over the transmission channels; to provide means for releasing the selecting storage mechanisms after their control has been effected and the price has been stored to permit of setting up a new selection control as previously selected indicators are actuated; to provide an improved impulse counting chain mechanism; to provide improved transmitting mechanism for controlling the receiving mechanism to provide for synchronization at any time after a transmission has been effected and during the control and operation of the indicators; and to provide improved means for facilitating the rapid and accurate transmission of controlling impulses and the rapid and accurate control and operation of any desired indicator assemblies in the quotation board.

Other objects of the invention will be obvious from the following description taken in connection with the drawings, in which:

Figs. 1 to 6 taken together show a wiring diagram of a receiving station.

Fig. 1 shows groups of relays for storing up the hundreds, tens and units digits of any desired stock number for controlling the selection of stocks, a group of relays for controlling the resetting of indicators within any selected assemblies or ranges of a selected group, and a group of relays for controlling the selection of the assembly or assemblies or the range or ranges in which a price change is to be effected;

Fig. 3 shows a group of impulse counting relays;

Fig. 5 shows multi-contact switches for effecting selection of any group of indicators;

Figure 4:
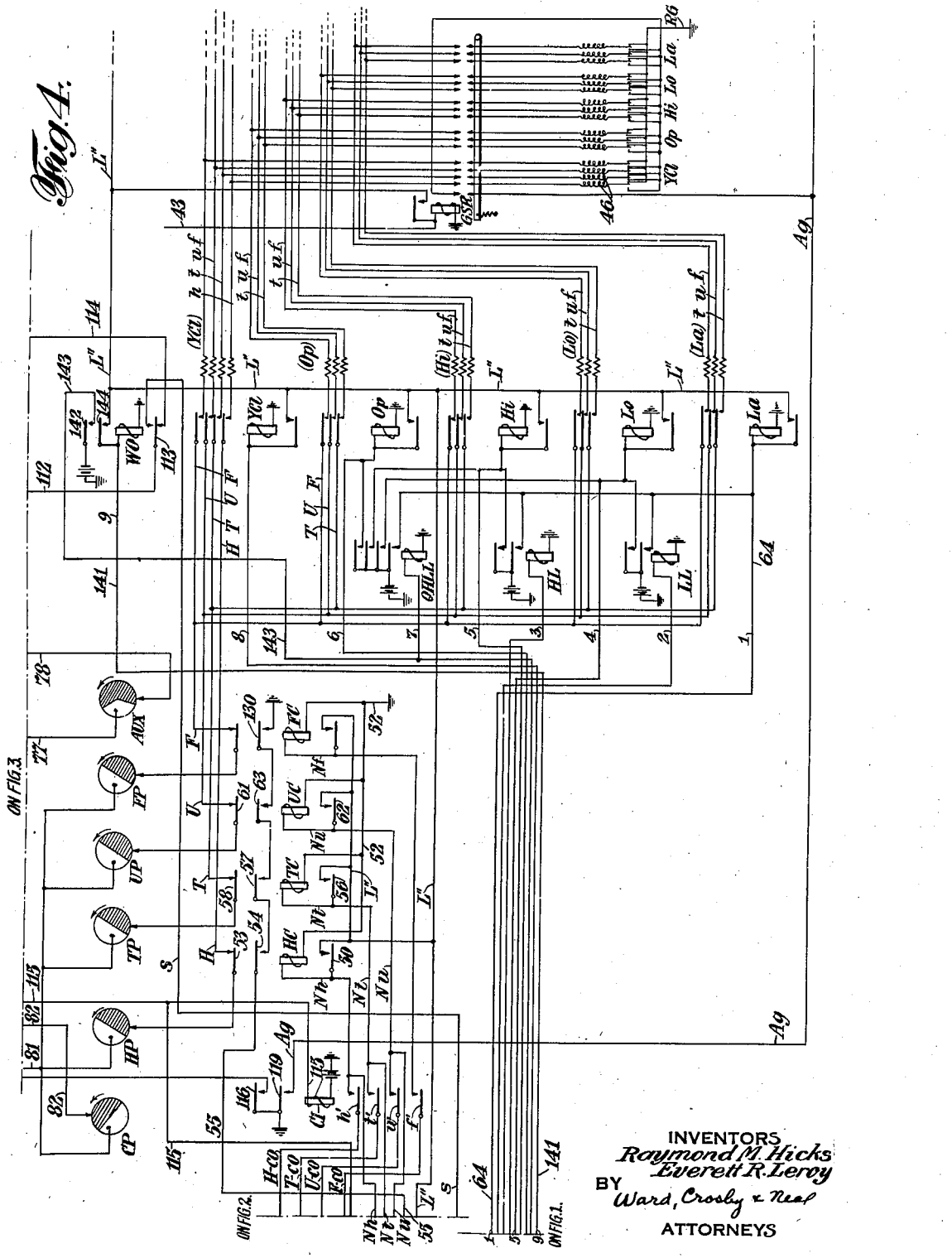
Fig. 4 shows relays for effecting selection of the range or ranges of any stock in which the price is to be changed and a plurality of interrupters for sending impulses to the selected range or ranges.

Fig. 6, together with a portion of Fig. 4, shows a plurality of groups of indicators;

Fig. 7 shows a keyboard for a transmitting mechanism that may be employed with this receiving mechanism;

Figs. 8 and 9 show a wiring diagram of the transmitter;

Fig. 10 shows a wiring diagram of the stock number, price digit and range groups of storage relays, and Fig. 11 shows a wiring diagram of the reset controlling groups of storage relays.

Figure 1:
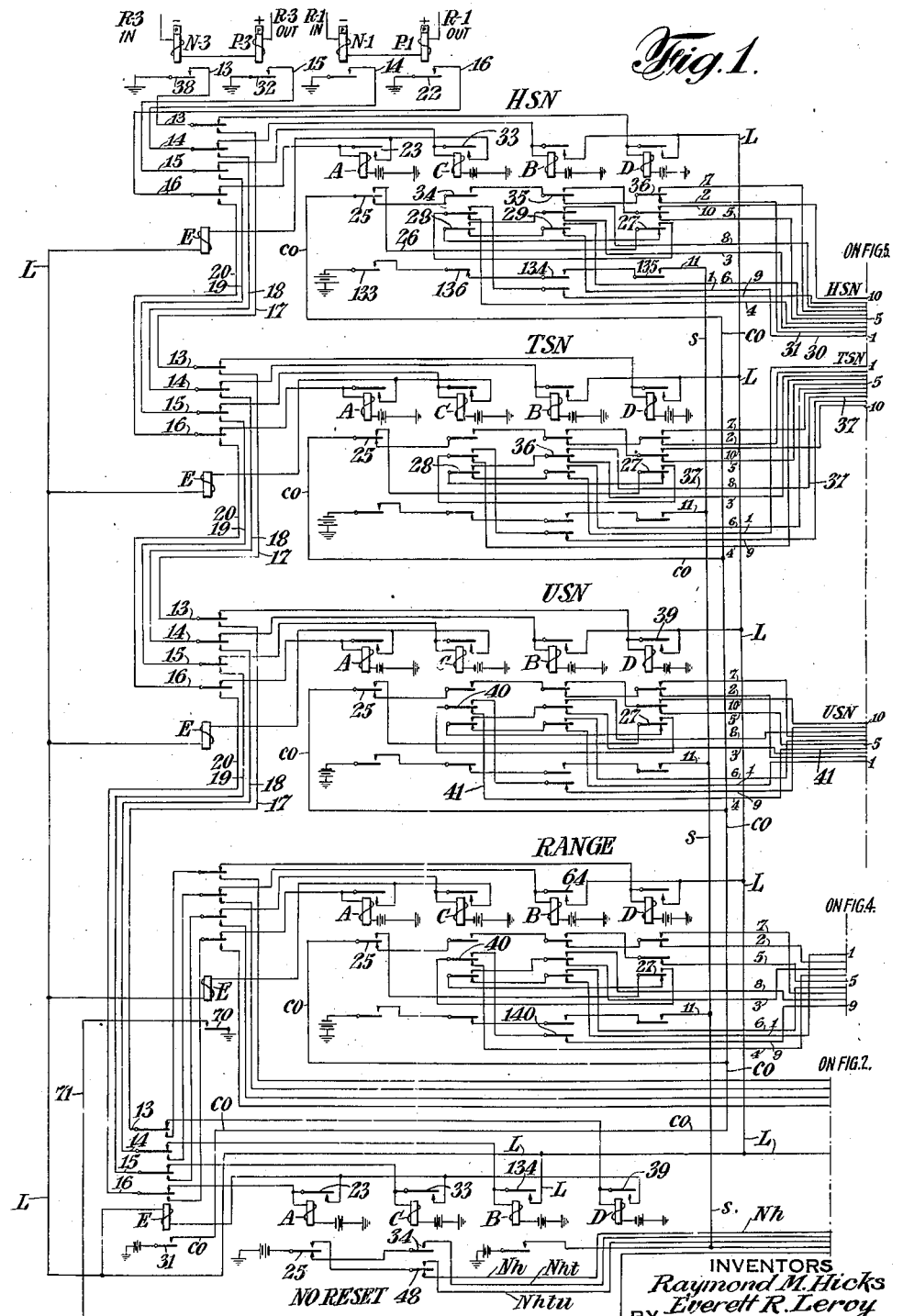

As shown in Fig. 1 the stock number selection storage relays may comprise three groups; a hundreds group, a tens group and a units group, designated respectively by HSN, TSN and USN.

In addition to these groups there is provided a no-reset group, designated No reset, to determine which indicator units of the selected range or ranges are to be turned to blank and to receive a set-up or to be left at the blank position. This figure also shows a range group of relays, designated Range, to determine in which assembly or range of the selected group of indicators the amount is to be set up, or to control the clearing in unison of all of the ranges except "yesterday's close."

Figure 2:
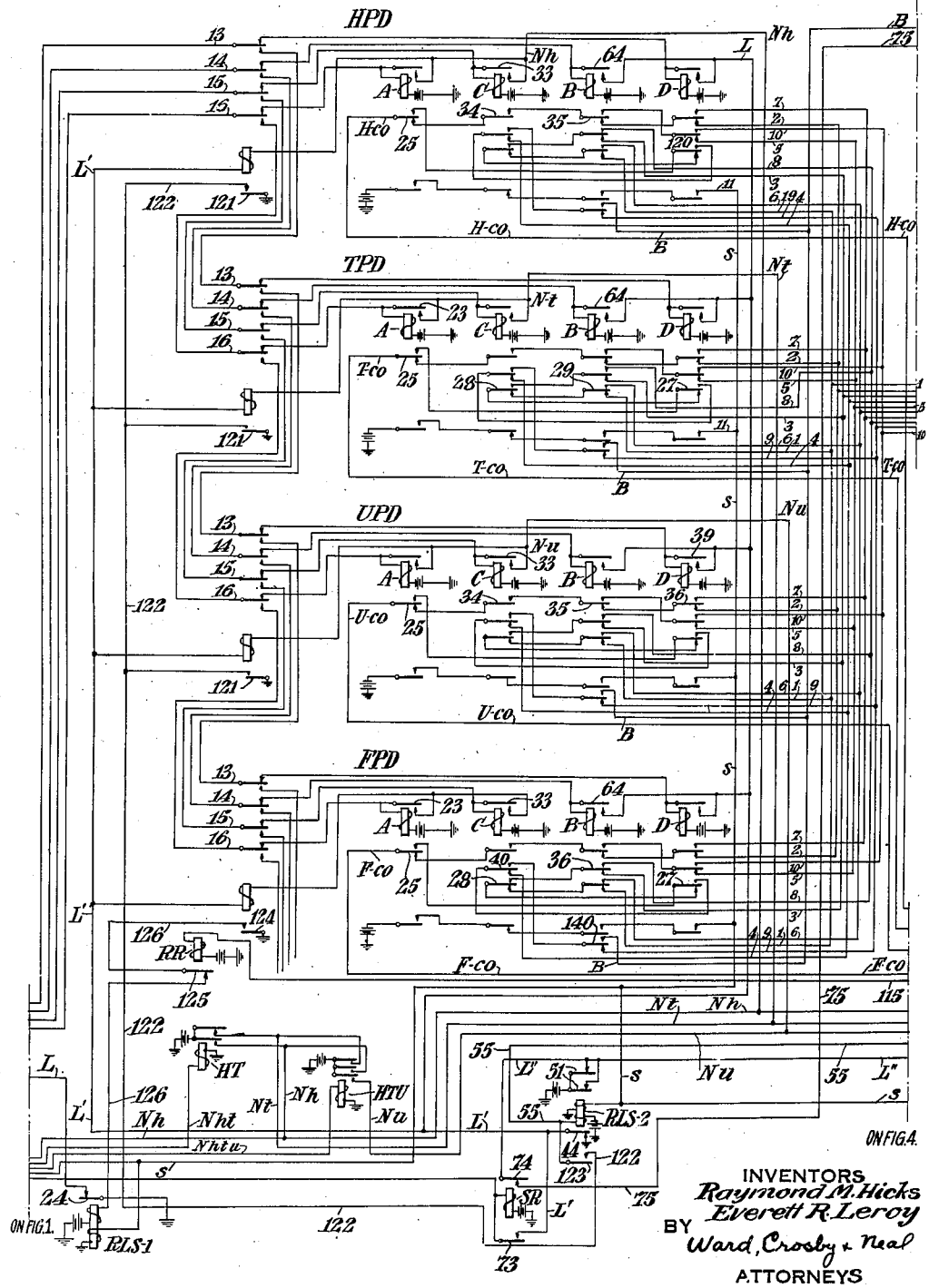
Fig. 2 shows the hundreds, tens, units and fraction price digits storage relays.

Fig. 2 shows hundreds, tens, units and fraction price digit groups of relays designated HPD, TPD, UPD and FPD for controlling the new set-up on the selected indicators.

As is apparent from an inspection of Figs. 1 and 2 the various groups of relays shown therein are substantially identical in construction. The difference between these groups will be pointed out as the construction and operation of the various groups are described.

Each of these groups of relays comprises relays A, C, B and D responsive respectively through the intermediary of polarized relays P—1, P—3, N—1 and N—3, to positive and negative impulses singly or in combination, simultaneously or successively, over the transmission channels R—1 and R—3. Each group of relays further includes a transfer relay E which picks up and switches the circuit connections to the following adjacent group, after termination of the inciting impulse of certain of these relays. The relays A, C, B and D are controlled by first and second impulses over the channels R—1 and R—3, as shown in the following table.

*Pulse code*

| Character of impulses | Channel | Polarized relay | Group relay |
|---|---|---|---|
| + | R-1 | P-1 (+) | A |
| + | R-3 | P-3 (+) | C |
| − | R-1 | N-1 (−) | B |
| − | R-3 | N-3 (−) | D |

| Relay combination | | Stock No. register groups | Reset register groups | Range register groups | Price digit register groups |
|---|---|---|---|---|---|
| On 1st pulse | On 2nd pulse | | | | |
| A | No second pulse required. | 1 | No reset H. | Last | 1 |
| C | do | 2 | No reset H, T. | LO-Last | 2 |
| AC | do | 3 | No reset H, T, U. | HI-Last | 3 |
| AD | do | 4 | | Low | 4 |
| CB | do | 5 | | High | 5 |
| B | A | 6 | | Open | 6 |
| D | C | 7 | | Unison | 7 |
| B | AC | 8 | | YCL | 8 |
| D | AC | 9 | | WO | 9 |
| D | BC | 0 | | | 0 |
| BD | AC | | | | Blank. |
| B | AD | Syn | Syn | Syn | Syn. |
| D | No second pulse required. | | Reset all | | |

*Stock number selection*

As the various groups of relays are all of the same form the circuit connections prepared over these groups will be traced out on several of the groups instead of on one group, to facilitate tracing the circuits prepared across these groups of relays.

By referring to the pulse code table, it will be seen that a positive impulse over the transmission channel R—1 will energize the polarized relay P—1 marked "+" associated with this channel. This relay picks up and closes its make contact 22 applying ground to line 16 connected over one of the normal make and break contacts of the transfer relay E associated with the hundreds stock number group HSN, and to one terminal of the coil of relay A the other terminal of which is connected to battery and ground. As the relay A is energized it closes a holding circuit from ground and battery over its coil and its make contact 23, over the coil of the transfer relay E, and over the locking line L connected over the break contact 24 of the release relay RLS—1, Fig. 2, to ground. The energization of the relay A also operates its make and break contact 25 thereby preparing a circuit from the cut-out line CO, over its contact 25 to line 26, over the normal make and break contact 27 of relay D, the normal make and break contact 28 of relay C, the normal make and break contact 29 of relay B to the "one" digit line 30 which, as shown in Fig. 5, is the energizing lead for the hundreds stock number selecting relay designated by HSN—1.

As described, a positive impulse over the transmission channel R—1 causes the relay A in the hundreds stock number group of relays to pick up and to establish a holding circuit over the coil of relay E and the locking line L to ground, and to connect the cut-out line CO over various contacts in this group of relays to the "1" digit line 30, which is grounded over relay HSN—1, Fig. 5. This cut-out line CO is normally held open at the make contact 31 of the transfer relay E associated with the No reset group of relays at the bottom of Fig. 1.

Referring again to the pulse code, a positive impulse over the transmission channel R—3 will energize the polarized relay marked "+" which through its make contact 32 and line 15 will apply ground to the relay C. Relay C will close its make contact 33 and establish a holding circuit over the coil of relay E and the locking line L. Relay C will also close its make contact 34 and prepare a circuit from the cut-out line CO over the normal make and break contact 25 of relay A, operated make contact 34 of relay C, normal make and break contact 35 of relay B, normal make and break contact 36 of relay D to the "2" digit line 31. This digit line, as shown in Fig. 5, extends over the coil of relay HSN—2 to ground.

By sending various impulses, as shown in the pulse code, the various digit lines 3, 4, 5, 6, 7, 8, 9, 10, may be connected to the cut-out line CO to prepare energizing circuits respectively for relays HSN—3 to HSN—10, Fig. 5.

Assuming now that the first impulse is a positive impulse on the transmission channel R—1, the relay A will pick up and establish a holding circuit over the coil of relay E and line L to ground, and prepare a circuit to the hundreds stock number selecting relay HSN—1, Fig. 5, as stated above. After this impulse has terminated the ground over the make contact 22 of the polarized relay controlled by this impulse will be broken permitting the transfer relay E to be energized in series with the relay A. As shown in the drawings either the relay A or the relay C and the transfer relay E cooperate as a pair of counters. When the transfer relay E is energized it disconnects the lines 13, 14, 15, and 16 from the hundreds stock number group and connects them to the lines 17, 18, 19 and 20 which continue to the lines 13, 14, 15 and 16 connected over the normal make and break contacts of the transfer relay E associated with the tens stock number group TSN, to the relays A, C, B and D of the tens stock number group. A subsequent impulse coming in over the lines R—1, R—3, therefore, controls the tens stock number group TSN.

Assuming simultaneous positive impulses on the transmission channels R—1 and R—3, the positive impulse on R—1 will cause energization of the relays P—1 and A and the positive impulse on R—3 will cause energization of the relays P—3 and C as explained above. With the relays A and C energized the cut-out line CO will be connected over the operated make and break contact 25 of relay A, the normal make and break contact 27 of relay D, the operated make and break contact 28 of relay C, the normal make and break contact 36 of relay B to the "3" digit line 37, which extends to a make contact in each of the multi-contact hundreds stock number selecting relays HSN—1 to HSN—10 in Fig. 5. When the simultaneous impulses over the transmission channels R—1 and R—3 cease, the transfer relay E for this group of relays will pick up and switch the lines 13, 14, 15 and 16 of this group of relays to the lines 13, 14, 15 and 16 of the units stock number group USN so that subsequent impulses over the transmission channels R—1 and R—3 will control the operation of this group of relays.

Assuming now a positive impulse over the transmission channel R—1 and a negative impulse over the transmission channel R—3, the positive impulse on the channel R—1 will cause the relays P—1 and A to pick up as before, and the negative impulse on the channel R—3 will cause the polarized relay N—3 marked "—" to pick up and complete a circuit from ground over its make contact 38, line 13, connecting line 17, line 13 entering the units stock number relay group, over the coil of relay D, to battery and ground. The relay D picks up and closes a holding circuit from ground and battery over its coil and its make contact 39 to the locking line L. With the relays A and D picked up, the cut-out line CO is connected over the operated make contact 25 of relay A, the operated make and break contact 27 of relay D, the normal make and break contact 40 of relay C, to the "4" digit line, designated by 41, which continues on Fig. 5 to the relay USN—4 of the units stock number selecting relays.

Operation of the relay groups HSN, TSN, and USN in sequence in accordance with the pulse code prepares circuits for one of the hundreds stock number selecting relays HSN—1 to HSN—10, for one of the tens stock number digit selecting lines from the tens stock number group to the multi-contact switches of the hundreds stock number selecting relays and for one of the units stock number selecting relays USN—1 to USN—10. The tens stock number digit lines are adapted to be connected through the multi-contact relays HSN—1 to HSN—10 with lines multiplied over the multi-contact relays USN—1 to USN—10, to lines 43 which as shown in Figs. 4 and 6 are the energizing leads for the multi-contact group selecting switches GSR. All of these lines are connected to the common cut-out line CO which is normally open at the make contact 31 of the transfer relay E of the "no reset" group. This contact 31 is connected to battery and ground.

While in the description of the operation of the hundreds, tens, and units stock number groups of relays only a few of the circuits have been traced the remaining circuits may be easily traced by referring to the pulse code above. Certain of the remaining circuits will be traced in connection with a description of the range relays and the price digit relays.

*Indicators*

The stock board comprises a large number of groups of indicator assemblies as indicated in Figs. 4 and 6. Each stock number group of assemblies may comprise five assemblies, such as "yesterday's close," "open," "high," "low" and "last" designated on Figs. 4 and 6, respectively, by YCL, Op, Hi, Lo, La. As shown, "yesterday's close" may comprise four indicating wheels as represented by four operating magnets 46 and the "open," "high," "low" and "last" indicator assemblies may each comprise three indicating wheels. The lowest indicating wheel in each assembly is used for the purpose of indicating fractions. The hundreds indicator in "yesterday's close" assembly will serve to indicate the hundreds digit price of the stock.

The indicators are operated by impulses over lines H, T, U and F, Fig. 4, which will operate the hundreds, tens, units and fractions indicators respectively when connected to any indicator assembly in any price range. As shown in Fig. 4, these four lines may be connected to the YCL indicators of a selected group by means of the make contacts of a relay YCL. The tens, units and fraction lines are branched off from the impulsing lines H, T, U and F referred to and these lines may be connected to the "open" indicators over the make contacts of a relay Op, to the "high" indicators over the make contacts of a relay Hi, to the "low" indicators over the make contacts of a relay Lo, and to the "last" indicators over the make contacts of a relay La. In this manner selection of any indicator assembly or price range within any group is effected.

If it is desired to select the "low" and "last" indicators simultaneously this may be done by energizing the relay LL which applies battery over its make contacts to the grounded circuits of the relays Lo and La. The "high" and "last" indicators may be selected simultaneously by energizing the relay HL which applies battery to the grounded circuits of relays Hi and La. All of the "open," "high," "low" and "last" indicators of any group may be selected simultaneously by energizing the relay OHLL which applies battery to the grounded circuits of all of the relays Op, Hi, Lo and La. By means of the relays described it is possible to select any one of the five assemblies in a selected group of indicators, or to simultaneously select the "high" and "last," the "low" and "last," or to select all of the assemblies "open," "high," "low" and "last."

*No reset group*

The new price may differ from the price already set up in the indicators in fractions, in fractions and units, in fractions, units and tens, or in fractions, units, tens and hundreds. The "no reset" group of relays, shown in Fig. 1, is provided for the purpose of controlling the restoration and actuation of the indicators within a selected assembly or range on which a price change is to be indicated.

*Reset of all indicators*

After the stock number has been set up by the first three impulses or sets of impulses coming in over the transmission channels R—1 and R—3, in the manner described, and the lines 13, 14, 15, and 16 have been extended by the transfer relay E of the units stock number group USN to the lines 13, 14, 15, and 16 entering the "no reset" group, the fourth impulse coming in over the transmission channels R—1 and R—3, will control the relays A, C, B and D in the No. Reset group in the same manner in which impulses controlled corresponding relays in the stock number groups. In this group the relay B locks directly to the line L while relays A, C and D lock to this line over the coil of relay E.

If the price change involves a change in the fractions, units, tens and hundreds positions, the "yesterday's close" indicators in these positions will be controlled to be restored and to take on a new set-up. As shown in the pulse code, a negative impulse over the transmission channel R—3 applies ground to line 13, which, as shown in Fig. 1, applies ground to the relay D which immediately closes a holding circuit over its make contact 39, over the coil of the transfer relay E associated with this group, to the locking line L. The operation of the relay E of the "no reset" group after termination of the impulse switches the lines 13, 14, 15, and 16 from this group to the "range" group, and at the same time it applies battery at its make contact 31 to the cut-out line CO which, through the circuit prepared by the hundreds stock number group, energizes one of the relays HSN—1 to HSN—10 on Fig. 5, applies battery to one of the digit lines prepared in the tens stock number which lines are extended over the multi-contact switches of the energized hundreds stock number selecting relay, and also applies battery to the circuit prepared by the units stock number group which, as shown in Fig. 5, is the energizing lead for one of the units stock number selecting relays USN—1 to USN—10, over each of which the tens stock number lines extended through the hundreds stock number selecting relays, are multiplied. This applies battery over the contact 31 referred to through a digit line in the tens stock number group of relays, over the multi-contact selecting switches for the hundreds and units stock number, to one of the lines 43, Fig. 5, which on Figs. 4 and 6 are shown as extending to the coils of group selecting relays GSR and to ground. This causes energization of one of the group selecting relays GSR which connects all of the busses for the various ranges to the energizing leads of the operating magnets 46 of all the indicators of the group of one board stock number. The relay D of the "no reset" group merely cooperates with the relay E to switch the lines 13, 14, 15 and 16 to the "range" group and to apply battery to the line CO.

*Reset of tens, units, and fractions indicators*

If it is desired to reset the tens, units and fraction indicators but not the hundreds a positive impulse will be sent over the transmission channel R—1 which will cause energization of the relay A in the "no reset" group. As the relay picks up it connects ground and battery over its operated make and break contact 25, over the normal make and break contact 48 of relay C to line Nh which, as shown in Fig. 2, extends to the coil of transfer relay E of the hundreds price digit group HPD to the locking line L' grounded over the normal break contact 44 of the release relay RLS—2. This energizes the transfer relay E and switches the connections 13, 14, 15 and 16 from the hundreds price digit group HPD to the tens price digit group TPD so that the first actuating impulses sent to the price digit groups of relays will control the tens price digit group TPD.

The line Nh referred to is shown at the lower right hand corner of Fig. 2 as branched to Fig. 4 and over the coil of relay HC, to ground. This causes the relay HC to pick up and through its make contact 50 to close a holding circuit for it from ground to battery over break contacts 51 of relay RLS—2, Fig. 2, line L'', contact 50, coil of relay HC, and line 52 to ground, and through its break contact 53 to disconnect the hundreds actuating line H from the hundreds pulsing interrupter HP, which will be later referred to. Relay HC also prepares another circuit over its make contact 54, the release line 55, and over the coil of relay RLS—2 to battery and ground.

*Reset of tens and fractions indicators*

If the price change involves a change in the units and fraction indicators but not in the hundreds and tens indicators a positive impulse over the transmission channel R—3 is transmitted to cause the relay C in the "no reset" group to pick up. Energization of this relay causes it to prepare a holding circuit as before and in addition through its make contact 34 completes a circuit from ground to battery over the normal make and break contact 25 of relay A, contact 34 and line Nht which at the bottom of Fig. 2 extends over the coil of relay HT to ground. The relay HT picks up and through its make contacts applies ground and battery to the line Nh which will have the same effect as before, and also to line Nt which will energize the transfer relay E of the tens price digit group of relays TPD which switches the lines 13, 14, 15 and 16 from the tens price digit group TPD to the units price digit group UPD, and as shown in Fig. 4 current in line Nt will energize the cut-out relay TC which completes its own holding circuit over its make contact 56 with line L'' and prepares a circuit over its make contact 57 to the release line 55 and disconnects the tens actuating circuit T from the tens interrupter TP by opening its break contact 58.

*Reset of fractions indicators*

If the only price change occurs in the fraction indicators positive impulses will be sent over the transmission channels R—1 and R—3 to cause energization of the relays A and C in the "no reset" group. These relays prepare circuits from ground and battery over the operated make and break contact 25 of relay A, operated make and break contact 48 of relay C to line Nhtu which on Fig. 2 is shown as extending over the coil of relay HTU to ground. This relay picks up and through its make contacts applies battery to the lines Nh and Nt, before described as controlling the switching of the lines 13, 14, 15, and 16 from the hundreds and tens price digit groups to the units price digit groups and as disconnecting the actuating lines H and T, Fig. 4, from the interrupters HP and TP. One of the contacts of relay HTU applies battery to line Nu which energizes the transfer relay E associated with the units price digit group to switch the lines 13, 14, 15, 16 from the units price digit group UPD to the fraction price digit group FPD. This line is branched off to the units cut-out relay UC, Fig. 4, which disconnects the actuating line U from the interrupter UP by opening its connection to the interrupter UP at its break contact 61. Energization of this relay also closes its holding circuit over its make contact 62 to line L'', and prepares a circuit to the release line 55 at its make contact 63.

Energization of any of the relays A, C, and D in the "no reset" group, as stated before, energizes the transfer relay E connected with this group which switches the lines 13, 14, 15 and 16 of this group to the lines 13, 14, 15 and 16 of the "range" group, and through its make contact 31 connects the common cut-out line CO for the HSN, TSN, USN and "range" group to battery and ground. The lines in the selector groups HSN, TSN and USN now effect selection and energization of the stock group selecting relay GSR which locks to the line L''. The function of the relay B will be referred to later.

Range group

The next impulses coming in over the transmission channels R—1 and R—3 will cause energization of relays A, C, B and D of the "range" group in combination as indicated in the pulse code. A positive impulse over the transmission channel R—1 will cause energization of the relay A which connects the common cut-out line CO now connected with battery over the make contact 31 of relay E of the "no reset" group, with the "one" line which, in Fig. 4, is shown as extending to the coil of the relay La. As this relay picks up it locks to the line L" and connects the actuating lines T, U and F, with the bus lines t, u and f, for the La indicators of the group of indicators selected.

A positive impulse over the transmission channel R—3 causes energization of the relay C which connects the cut-out line CO to the "two" line which, as shown in Fig. 4, energizes the relay LL which over its make contacts applies ground and battery to the relays Lo and La, which simultaneously connect the actuating lines T, U and F, to the bus lines t, u and f, for the "low" and "last" indicators and lock to the line L".

Positive impulses over the transmission channels R—1 and R—3 cause energization of the relays A and C which connect the cut-out line CO to the "three" line which, as shown in Fig. 4, is the energizing lead for the relay HL. As the relay HL picks up it applies ground battery over its make contacts to the coils of relays Hi and La which connect the actuating lines T, U and F, to the bus lines t, u and f, for the "high" and "last" indicators and lock to the line L".

A positive impulse over the transmission channel R—1 and a negative impulse over the transmission channel R—3 cause energization of the relays A and D which connect the cut-out line CO to the "four" line which is the energizing lead for the relay Lo which connects the actuating lines T, U and F, to the bus lines t, u and f, extending to the "low" indicators and locks to the line L".

A positive impulse over the transmission channel R—3 and a negative impulse over the transmission channel R—1 cause the relays C and B to pick up, which connect the CO line to the "five" line, which is shown as the energizing lead for the relay Hi which connects the actuating lines T, U and F, to the bus lines t, u and f, for the "high" indicators and locks to the line L".

If it is desired to reset and actuate the "open" indicators a negative impulse will first be sent over the transmission channel R—1 to cause energization of the B relay. This will have no effect on the transfer relay E as the B relay closes its holding circuit at its make contact 64 directly with the release line L. This impulse will be followed by a positive impulse on the transmission channel R—1 which will cause energization of the relay A which prepares a circuit to energize relay E as the impulse ceases. When A and B are picked up the line CO will be connected to the "six" line which, as shown in Fig. 4, is the energizing lead for relay Op. This relay connects the actuating lines T, U and F, to the bus lines t, u and f, for the "open" indicators and locks to the line L".

All of the "open," "high," "low" and "last" busses t, u and f may be connected to the actuating lines T, U and F, by energization of the relay OHLL, Fig. 4, the coil of which may be connected to the cut-out line CO over the "seven" line by energization of relays D and C responsive, respectively, to a negative impulse on the transmission channel R—3 and a subsequent positive impulse on the transmission channel R—3 as shown in the pulse code. The relay OHLL grounds the circuits of the relays Op, Hi, Lo and La which connect their respective busses to the actuating lines H, T, U and F and lock to the line L".

The YCL bus lines may be connected to the actuating lines H, T, U and F, by energization of the relay YCL, Fig. 4, which may be connected to the cut-out line CO, Fig. 1, over the "eight" line by energization of relay B responsive to a negative impulse on the transmission channel R—1, and subsequent energization of relays A and C responsive to positive impulses on the transmission channels R—1 and R—3, respectively. The relay YCL locks to the line L".

After selection of the price range has been effected, as indicated, the transfer relay E of the "range" group picks up and switches the lines 13, 14, 15 and 16 from this group to the hundreds price digit group HPD, in Fig. 2, so that the next impulses over the transmission channels will cause energization of the relays in this group, unless the transfer relay E of this group under the control of the "no reset" group of relays has switched lines 13, 14, 15, and 16 from the hundreds price digit group HPD to the tens price digit group TPD, in which event the impulses coming over the lines 13, 14, 15 and 16, will control the relays of the tens price digit group and so on. The first impulses coming in over the lines 13, 14, 15 and 16 are directed to the hundreds price digit group, or the tens price digit group, or the unit price digit group, or the fraction price digit group, under the control of the set-up in the "no reset" group of relays. The transfer relay E, in the "range" group, also through its make contact 70 applies ground to line 71 which, on Fig. 2, is shown as the ground line for the "start restoring" relay SR.

Restoration of indicators

Energization of the relay SR closes a holding circuit over its make contact 73 and the break contact 44 of relay RLS—2 to ground. It also applies battery from the line L" over the pair of break contacts 51 of the release relay RLS—2, over its own make contact 74 to line 75 which, on Fig. 3, extends over a break after make contact 76 of the stop counting relay SC to line 77 which, on Fig. 4, extends across the auxiliary interrupter Aux to line 78 which, on Fig. 3, extends over the coil of the "start pulsing" relay SP to ground. The relay SP picks up and closes its holding circuit from the line 77 over its make contact 79. It also applies battery over its make contact 80 to line 81 which, as shown in Fig. 4, is connected over the interrupters HP, TP, UP and FP, to the actuating lines H, T, U and F, before referred to, and also over the counter-interrupter CP to line 82 which, on Fig. 3, extends to the counting chain of relays shown in this figure. This chain includes ten relays, Y, X, W, 1, 2, 3, 4, U, V and T. The interrupter Aux closes a circuit to the start pulsing relay SP before the interrupters HP, TP, UP and FP are in position to send impulses. The counter-interrupter sends a counting impulse to the counting chain after the impulses to be counted have been transmitted to the selected indicators. Below is given a table showing the control of these relays by the impulses over the line 82 on these relays. The letter O indicates that the relay is operated, while the letter R indicates that the relay is released.

*Operation of counting chain relays*

| Y | X | W | 1 | 2 | 3 | 4 | T | U | V | Pulse |
|---|---|---|---|---|---|---|---|---|---|---|
| R | R | R | O | R | R | R | R | R | R | 1 on |
| R | R | O | O | R | R | R | R | R | R | 1 off |
| R | R | O | O | O | R | R | R | R | R | 2 on |
| R | O | R | O | O | R | R | R | R | R | 2 off |
| R | O | R | R | O | O | R | R | R | R | 3 on |
| O | R | R | R | O | O | R | R | R | R | 3 off |
| O | R | R | R | R | O | O | R | R | R | 4 on |
| R | R | O | R | R | O | O | R | R | R | 4 off |
| R | O | R | R | R | R | O | O | R | R | 5 on |
| R | O | R | R | R | R | O | O | R | R | 5 off |
| O | R | R | R | R | R | O | O | R | R | 6 on |
| O | R | R | R | R | R | R | O | O | R | 6 off |
| O | R | R | R | R | R | R | O | O | R | 7 on |
| R | R | O | R | R | R | R | O | O | R | 7 off |
| R | O | R | R | R | O | R | O | O | O | 8 on |
| R | O | R | R | R | O | R | O | O | O | 8 off |
| R | O | R | R | R | O | R | O | O | O | 9 on |
| O | R | R | R | R | O | R | O | O | O | 9 off |
| O | R | R | R | R | R | R | O | O | O | 10 on |
| R | R | O | R | R | R | O | O | O | O | 10 off |

*Counting chain relays*

The first impulse over the line 82 goes over the break contact 83 of relay X, over the normal break and make contact 84 of relay W, over the break contact 85 of relay Y, over the coil of relay 1 to ground. Relay 1 picks up and at its make contact 86 prepares a circuit from the line 77 over the break contact 87 of relay X, and over the coil of relay W which will be extended to ground over the coil of relay 1 when the first impulse on the line 82 ceases. As shown in the table, when the first impulse on line 82 ceases, relays W and 1 will be energized in series. The relays 1 and W act as a pair of counters.

Relay 1 at its make contact 88 connects battery on line 77 to the "one" line which is the "one" line in the price digit groups, which, when "one" is set up in any one or all of these groups, will be extended through one or all of these groups to the cut-out relays HC, TC, UC and FC on Fig. 4, before referred to, under the control of the cut-in relay CI, Fig. 4, which is energized during setting-up operations as will be described later. Before the first impulse is sent over the line 82 to the counting chain, the interrupters HP, TP, UP and FP will cause impulses to go out over the actuating lines H, T, U and F, that are connected to the interrupters and thence to the operating magnets 46 of the selected indicators which are grounded when out of blank position at RG as shown in the applications of M. Haselton, Serial No. 276,883, filed May 11, 1928, and Serial No. 423,599, filed January 27, 1930, now respectively Patent 2,067,187 dated January 12, 1937, and Patent 2,049,499, dated August 4, 1936, to move each of the indicators ahead one step in the process of turning them forwardly to blank position.

As the second impulse comes in over line 82 following the second impulses to the selected indicators, the relays W and 1 are still energized, and the impulse will go over the break contact 83 of relay X, the operated make and break contact 84 of relay W, and over the coil of relay 2 to ground. Relay 2 prepares a circuit over its make contact 89 from line 77 over the break contact 90 of relay Y, coil of relay X, and coil of relay 2 to ground. When the second impulse which energized relay 2 ceases, the relays X and 2 acting as a pair of counters will be connected in series between the line 77 and ground, and relay X will be energized in addition to relay 2. Energization of relay X breaks the circuit over relays W and 1 at its break contact 87 with the result that the "one" line will be disconnected from line 77. After the impulse has ceased the relays X and 2 are energized and the relay 2 through its make contact 91 connects the line 77 over the normal make and break contact 92 of relay V and the normal make and break contact 93 of relay T to the "two" line 94 which controls the cut-out relays HC, TC, UC and FC during setting up operations of the indicators in the same way in which they are controlled over the line 88 previously referred to and as will be described later.

As the third impulse comes in over the line 82, following the third impulses to the selected indicators, relays X and 2 being operated, the impulse will continue over the normal make and break contact 95 of relay Y, operated make contact 96 of relay X, and over the coil of relay 3 to ground. Relay 3 picks up and closes a circuit at its make contact 97 to the line 77 over the normal break contact 98 of relay W, the coil of relay Y, operated make contact 97 of relay 3, and over the coil of relay 3 to ground, energizing the relays Y and 3 in series as the impulse ceases. As the relay Y picks up it opens its break contact 90 thus deenergizing relays X and 2. Deenergization of relay 2 disconnects the "two" line from line 77. Relay 3 also closes its make contact 98 and establishes a circuit from line 77 over the normal make and break contact 99 of relay V, operated make contact 98 of relay 3, normal make and break contact 100 of relay U to the "three" line. As the relay 2 released it opened the circuit from line 77 to the "two" line at its make contact 91. The relays 3 and V operate as a pair of counters.

Following the fourth impulses to the selected indicators, the next impulse over line 82, with relays Y and 3 energized, goes over the operated make and break contact 95 of relay Y, the normal break contact 101 of relay W to the coil of relay 4 and to ground. Relay 4 picks up and closes its make contact 102 which prepares a circuit from the line 77 over the normal break contact 87 of relay X, coil of relay W, make contact 102 of relay 4, and coil of relay 4 to ground. The relays 4 and W now act as a pair of counters and as the impulse ceases the relays W and 4 will be energized in series. As relay W picks up it opens its break contact 98 which opens the circuit over the relays Y and 3. The release of relay 3 opens its contact 97 and disconnects the "three" line from line 77. As relay 4 picks up it connects line 77 over its make contact 103, over the normal make and break contact 104 of relay V, over the normal make and break contact 105 of relay T to the "four" line, thus connecting this line to line 77.

Relays W and 4 are energized as the fifth impulse comes in over line 82 and after the fifth impulses have been sent to the selected indicators. The impulse proceeds over the normal break contact 83 of relay X, over the operated make and break contact 84 of relay W, to the coil of relay 2 to ground. Relay 2 picks up and applies battery over its make contact 104', make contact 105 of relay 4, normal make and break contact 106 of relay U to the coil of relay T. Relay T picks up and prepares a circuit from line 77 over coil of relay U, over its make contact 107 to coil of relay T to ground. Relay 2 also prepares a circuit from line 77 over the normal break contact of relay Y, over the coil of relay X, over its make contact 89, and coil of relay 2 to ground. As the impulse ceases relays W and 4 will release and relays X and 2, and relays U and T, will be operated in series. Relay 4 at contact 103 disconnects the "four" line from line 77 and relay T at its contact 93 connects line 5 over the normal make and break contact 92 of relay V, operated make contact 91 of relay 2 to the line 77. Relays T and U will remain locked up as long as battery is applied to line 77.

After the sixth impulses have been sent to the selected indicators, a sixth impulse comes in over line 82 with relays X, 2, T and U picked up and proceeds over the normal make and break contact 95 of relay Y, the operated make contact 96 of relay X to the coil of relay 3. Relay 3 picks up and at its make contact 97 connects the coil of relays 3 and Y in series to line 77. As the pulse ceases relays 3 and Y come up in series and Y opens the circuit of relays X and 2 deenergizing the same. Deenergization of relay 2 disconnects line 77 from the "five" line at its break contact 91. Energization of relay 3 connected the "six" line over the operated make and break contact 100 of relay U, operated make contact 98 of relay 3, normal make and break contact 99 of relay V to line 77.

After the seventh impulses have been sent to the selected indicators, a seventh impulse comes in over line 82 with the relays Y, 3, T and U energized. The impulses on line 82 proceeds over the operated make and break contact 95 of relay Y, normal break contact 101 of relay W, to coil of relay 4 to ground. Relay 4 prepares a circuit at 102 from line 77, normal break contact 87 of relay X, coil of relay W, coil of relay 4 to ground. As the impulse ceases relays W and 4 will be energized in series. Relay W opens the circuit for relays Y and 3 at its break contact 98 and relays 3 and Y deenergize. Relay 4 connects line 77 over its make contact 103, normal make and break contact 104 of relay V, operated make and break contact 105 of relay T, to the "seven" line. The "six" line was disconnected from line 77 by release of relay 3 opening the circuit at its make contact 98.

After the eighth impulses have gone out over the actuating lines H, T, U and F, and an eighth impulse comes in over the line 82, relays W, 4, T and U are energized. The impulse goes over the normal break contact 83 of relay X, operated make and break contact 84 of relay W, to coil of relay 2 which prepares at 89 a circuit for relays X and 2. As the impulse ceases relays X and 2 come up. X at its contact 87 releases relays W and 4. Relay 2 first came up and closed its contact 104′ and applied battery over contact 104, operated make contact 105 of relay 4, operated make contact 106 of relay U and coil of relay V to ground. As relay V picks up it closes a holding circuit over its make contact 108 to line 77. As relay 4 releases, V is held over contact 107 from line 77. Relay 4 opens the circuit to the "seven" line at its contact 103 and relay V closes a circuit from line 77 over the operated make contact 91 of relay 2, operated make and break contact 92 of relay V to the "eight" line. The relays X, 2, U, T and V are now energized.

After the ninth impulses have gone out over lines H, T, U and F, the ninth impulses coming in over line 82, goes over the normal break contact 95 of relay Y, and the operated make contact 96 of relay X to the coil of relay 3 which prepares a circuit over its make contact 97 from line 77, over the coils of relays Y and 3. As the impulse ceases relay Y comes up and opens the circuit for relays X and 2, the latter disconnecting at its break contact 91, the "eight" line from line 77, relay 3 having already connected the "nine" line over its make contact 109, operated make and break contact 99 of relay V to line 77. As relay Y comes up it breaks at its break contact 90 the circuit for relays X and 2. When the ninth impulse is off relays Y, 3, T, U and V are operated.

Following the tenth impulses going out over lines H, T, U and F, the tenth impulse coming in over line 82 goes over the operated make and break contact 95 of relay Y, over the normal break contact 101 of relay W to the coil of relay 4. Relay 4 prepares a circuit from line 77 over the coils of relays W and 4. As the impulse ceases relays W and 4 pick up, relay W opens the circuit of relays Y and 3, relay 3 at 98 disconnects line 9 from line 77. Relays W, 4, U, T and V are now up. Relay 4 connects line 77 over its closed contact 103, over the operated make and break contact 104 of V, to line 110, over normal make and break contact 110 of the "start actuating" relay SA to line 112, over the normal make and break contact 113 of the "wipe out" relay WO, Fig. 4, over line 114 to coil of "stop counting" relay SC to ground. The relay SC picks up and at its make contact 114′, applies ground to line 115 completing a circuit over the "cut-in" relay CI, Fig. 4, which connects all of the cut-out lines H—co, T—co, U—co and F—co extending to the price digit group of relays in Fig. 2 to the cut-out relays HC, TC, UC and FC. The line 115 is branched off to the coil of relay RR, Fig. 2, to cause this relay to pick up and open the energizing circuit of relay RLS—1 which applies ground at its break contact 24 to the locking line L, permitting stock number information to be set up.

Relay SC also at its break after make contact 76 disconnects line 77 from line 75, and connects line 75 over its coil to ground to hold up this relay until relay RLS—2 is energized. As line 77 is disconnected from line 75, all of the counting chain relays release. Relay SC at its contact 115 applies battery to line B, the purpose of which will be referred to later. As the cut-in relay CI, Fig. 4, is energized it closes its make contact 116 and applies ground through line 117 to the "start actuating" relay SA, Fig. 3, to which battery and ground are applied as shown. This relay SA also operates its make and break contact 111 and connects the "ten" line during actuation in which the counting chain relays are still energized, as later described, over this contact to line 110, over contact 104 of relay V and contact 103 of relay 4 to the line 77, for purposes later referred to. It also closes its make contact 118 and connects line 75 to line 77 which is connected over the coil of the relay SC to ground. The relay CI also closes its contact 119 and applies ground to the actuation line Ag connected over an operated multi-contact switch GSR to one of the ground lines of the operating magnets of the selected group of indicators.

The control of the counting relays during restoration of the indicators controls the transmission of ten impulses by the interrupters HP, TP, UP and FP over one or more or all of the actuating lines H, T, U and F to the selected indicator or indicators. The ground RG, Fig. 4, is applied as shown in the application referred to whenever the indicators are out of their blank position. These indicators bear a blank and digits 1 to 9 and 0 so that it requires ten impulses to clear an indicator exhibiting the indicia one (1). As the indicators arrive, respectively, at blank, the ground RG is disconnected and of course the impulses over the respective actuating lines H, T, U and F cease, though the interrupters which are all on the same shaft continue to rotate.

The actuation ground Ag is applied by the cut-in relay CI, and the line 77 is connected to battery by the start actuating relay SA, as described, and actuation of the indicators will be initiated at once under the control of the price digit relays which have preferably been operated by impulses immediately following the impulses which controlled the range group of relays designated Range.

*Price digit register groups*

Following the impulses controlling the range group which controls the "starting restoration" relay SR, and while the restoration is proceeding, the next impulse on the transmission channels R—1 and R—3, if we assume that the relay D in the "no reset" group is operated as in the case where the hundreds, tens, units and fraction digits of the price are to be changed, will operate the hundreds price digit group of relays HPD, Fig. 2. A positive impulse on the transmission channel R—3 and a negative impulse on the transmission channel R—1 will, according to the pulse code given hereinbefore, cause the relays C and B to pick up. This will prepare a circuit from the line H—co over the normal make and break contact 25 of relay A, the operated make contact 34 of relay C, the operated make and break contact 35 of relay B, and over the normal make and break contact 120 of relay B to the "five" line. Relay B closes a holding circuit to line L′ over its make contact 64. Relay C closes its make contact 33 and as the impulse ceases a circuit will be made from battery over the coil of relay C, over its contact 33, over the coil of relay E to the locking line L′ for the price digit groups of relays. The transfer relay E switches the lines 13, 14, 15 and 16 from the hundreds price digit group HPD to the tens price digit group TPD. Transfer relay E also applies ground at its make contact 121 to line 122 which at the normal make contact 123 of relay RLS—2 will, when this relay is energized, apply ground to the coil of release relay RLS—2 to which battery is applied.

If we assume now that number six is to be set up in the tens price digit group TPD a negative impulse on the transmission channel R—1 will cause energization of the relay B and this relay will lock to line L′ over its make contact 64, and a subsequent positive impulse on the transmission channel R—1 will cause energization of the relay A, which prepares a circuit over its make contact 23 and coil of relay E to the locking line L′. This will connect the line T—co over the operated make and break contact 25 of relay A, the normal make and break contact 27 of relay D, the normal make and break contact 28 of relay C and the operated make and break contact 29 of relay B to the "six" line. The first impulse which caused the operation of the relay B did not affect the relay E which, however, was energized as the second impulse which energized the relay A ceased. The transfer relay E switches the lines 13, 14, 15, 16 from tens price digit group TPD to the lines 13, 14, 15, 16 of the units price digit group UPD. The transfer relay E also applies ground at its make contact 121 over line 122, open at the normal make contact 123 of relay RLS—2, as before.

If we assume that the digit seven is to be set up in the units price digit group a negative impulse will be sent over the transmission channel R—3 to cause energization of the relay D, and a second positive impulse will be sent in over the transmission channel R—3 to cause energization of the relay C. Relay D over its make contact 39 locks to line L′. Relay C prepares a circuit at its make contact 33 from ground and battery over the coil of relays C and E as before. This connects the lines U—co over the normal make and break contact 25 of relay A, the operated make contact 34 of relay C, the normal make and break contact 35 of relay B and the operated make and break contact 36 of relay D to the "seven" line. As the impulse energizing relay C ceases the transfer relay E will be operated and will switch the lines 13, 14, 15 and 16 from the units price digit group UPD to the fractions price digit group FPD, and will also apply ground to the line 122 at its contact 121.

If we assume now that the numeral eight is to be set up in the fractions digit group FPD as for example, if the fractions were to be indicated in tens, or if it were desired to indicate the total number of shares of any particular stock sold, a negative impulse over the transmission channel R—1 will cause relay B to pick up and a second set of positive impulses over the transmission channels R—1 and R—3 will cause relays A and C to pick up. The relay B will lock to the line L′ as before and relays A and C will prepare circuits over relay E to line L′. Relays A, B and C will connect the line F—co over the operated make and break contact 25 of relay A, the normal make and break contact 27 of relay D, the operated make and break contact 28 of relay C, and the operated make and break contact 36 of relay B to the "eight" line. When the second impulse ceases, the relay E picks up in series with relays A and C over locking line L′ and relay E applies ground to line 126 which is connected over one coil of relay RLS—1 to battery and ground. The line 126 is carried over a break contact 125 of relay RR which is grounded over line 115 as the cut-in relay CI, Fig. 4, is grounded by the "stop counting" relay SC, Fig. 3, after ten restoring impulses have been sent out over the actuating lines H, T, U and F, Fig. 4. As the relay RLS—1 picks up it operates its break contact 24 and removes ground from the locking line L thereby causing the relays in Fig. 1 to release. As the relay RR picks up after restoration has been completed, it breaks the circuit of relay RLS—1 which releases and applies ground to the locking line L to permit a new stock number to be set up in groups HSN, TSN and USN.

The "start pulsing" relay SP, Fig. 3, is actuated by the first impulse over the auxiliary interrupter Aux which is orientated slightly ahead of the other interrupters. The first impulse is sent over this interrupter when the lines 77 and 75 have been connected over the operated make contact 74 of the "start restoring" relay SR, Fig. 2, and make contact 51 of the release relay RLS—2 to battery and ground. The SR relay is energized when ground is applied to line 71, Fig. 1, by the make contact 70 of relay E of the "range" group of relays. That is, restoration is started after selection control has been set up in each of the groups of relays in Fig. 1.

The largest number of impulses required to set up the price is eight as for example, according to the pulse code, eight impulses would be required to set up the price 678¾. Restoration always requires ten impulses so that the relay RR will never be picked up at the time the relay E of the fractions price digit group FPD is energized to ground the release relay RLS—I.

By means of the controls described, restoration is started after the range has been selected which completes the selection, and all of the relays in Fig. 1 will be released after the fractions price digit has been set up in the group of relays FPD. When restoration has been completed, that is, after ten impulses have been sent out over the actuating line H, T, U and F, the relay RR is energized simultaneously with the cut-in relay CI, causing deenergization of relay RLS—I which applies ground over its normal make contact 24 to the locking line L so that impulses may now be sent over the transmission channels to select another stock by preparing circuits over groups HSN, TSN and FSN.

*Actuation of indicators*

After the stop counting relay SC has been energized and the counting chain relays have been deenergized, and the start actuation relay SA and the cut-in relay CI have been energized, the line 77 will be connected successively to the various digit lines connected in the price digit relays HPD, TPD, UPD and FPD to the cut-out lines H—co, T—co, U—co and F—co which, as shown in Fig. 4, are connected over the operated make contacts h', t', u' and f' to the cut-out relays HC, TC, UC and FC.

Impulses will be sent out over all of the actuating lines H, T, U and F unless these lines were disconnected from the interrupters by relays HC, TC, UC and FC under control of the "no reset" relays.

Immediately after the first impulse has gone out over the actuating lines H, T, U and F, the "one" digit line in the counting chain will be connected to the current carrying line 77. This line, as well as all of the other digit lines, is multipled into all of the price digit groups of relays. If any of the "one" digit lines are connected with their cut-out lines H—co, T—co, U—co and F—co, the current will continue to the respective cut-out relays HC, TC, UC and FC, Fig. 4, which will pick up and disconnect the respective actuating lines H, T, U and F from their interrupters so that no other impulses will be transmitted to the respective indicators which now indicate the numeral one (1).

After the second impulse has gone out over the actuating lines H, T, U and F, line 77 will be connected to the "two" digit line which when connected across the price digit groups with any of the cut-out lines H—co, T—co, U—co and F—co will energize the corresponding cut-out relays HC, TC, UC and FC.

If, as in the description, the "five" digit line is connected to the H—co line, the "six" to the T—co line, the "seven" to the U—co line and the "eight" to the F—co line, the first five impulses will go out over lines H, C, U and F, and the relay HC will be energized after the fifth impulses have gone out so that no more impulses will go out over the line H. After the "sixth" impulses have gone out over lines T, U and F the relay TC will be energized and impulses over line T will discontinue. Impulses over line U discontinue after the seventh impulses have gone out over lines U and F, and impulses over line F will discontinue after the eighth impulse has gone out over line F.

As the FC relay is picked up, and which in the assumed operation is the last to be picked up, it completes the ground connection to the release line 55 over operated make contacts 54, 57, 63 and 130. This, as shown in Fig. 2, causes the relay RLS—2 to pick up which removes battery at its contacts 51 from lines L' and L'' thereby releasing all of the relays in the price digit groups and all of the relays in Figs. 3, 4, 5 and 6. The relay RLS—2 is maintained energized over its contact 123, line 122, and contacts 121 of the relays E of the price digit group relays HPD, TPD and UPD, thus insuring that the line L' is disconnected from ground until all of the relays in these groups have been released. The release of relays E causes the release of the RLS—2 relay, thus normalizing all relays except those in the stock number groups which are locked to line L over the normal break contact of release relay RLS—I.

As the E relay in the "range" group deenergizes under control of the relay RLS—I, it removes ground from the line 71 which is a ground line for the circuit through the coil of the "start restoring" relay SR, Fig. 2. This relay is held up over its make contact 73 as long as line L' is grounded over the break contact of the release relay RLS—2 so that it will apply battery to line 75 during actuation as well as restoration. Battery is removed from line 75 by opening the contacts 51 of the release relay RLS—2 when the circuit for this relay is grounded as the last necessary actuation impulse is sent out over lines H, T, U and F.

*Synchronization*

It is desirable at intervals or in case any one of the various receiving stations is out of step with the transmitter, to synchronize all of the receiving stations. This may be done at any stage in the setting up operation as shown in the pulse code by impulses causing energization of relays A, B and D in any one of the stock number or price digit groups or the range group or an impulse to energize relay B of the "no reset" group. This completes a circuit from battery over make contacts 133, 134 and 135 of these relays and normal break contact of relay C, and line 9 over the coils of relays RLS—I and RLS—2, energizing both relays and restoring all of the mechanism to normal.

*Clearing "open," "high," "low" and "last" in unison*

After groups HSN, TSN and USN have been controlled, a negative impulse is sent over the transmission channel R—3 which causes the relay D, of the "no reset" group, to pick up which merely switches the lines 13, 14, 15 and 16 to the "range" group. This is followed by impulses causing energization of relays A, C and D in the "range" group which connect the CO line to the "nine" line over the normal make contact 140 of relay B, the operated make and break contact 40 of relay C, the operated make and break contact 27 of relay D, and the operated make and break contact 25 of relay A to the CO line. The "nine" line, Fig. 4, designated as 141, is grounded over the wipe-out relay WO which at its make contact 142 connects battery over line 143 to the coil of relay OHLL which, as before, causes all of the relays Op, Hi, Lo and La to pick up.

Relay WO at its make contact 144 connects the "nine" line 141 to the line L'', which is the holding line for relays Op, Hi, Lo, La and GSR.

Relay WO also at its operated make and break contact 113 connects line S to line 112 which is connected across the normal make and break contact 111 of relay SA to the line 110 to which battery is applied as the tenth impulses are sent out over line H, T, U and F thus putting battery on line S which is grounded over a second coil of the release relays RLS—1 and RLS—2 causing these relays to remove battery from all of the holding lines L, L' and L'' and the apparatus to clear.

*Blanking indicators*

If it is desired to rotate any of the indicators of a selected assembly or assemblies or range or ranges to the blank position as in the case in which the new price does not include hundreds, or tens, or units, or fractions digits, or several of these, the stock number, no reset, and range controls are set up as conditions require and after this set-up has been effected, the price digit groups are controlled as usual with the exception that the group corresponding to the indicator wheel that is to be cleared and left in the blank position will be controlled by a first set of impulses over the transmission channels to cause relays B and D to pick up and a second set of impulses that will cause relays A and C to pick up.

Assume that the price is to be changed from 99 5/8 to 98. No control will be set up in groups HPD and TPD. In the units group UPD, the eight line will be connected to the locking line L'. In the fractions group FPD, the relays B and D, and A and C will be energized. This prepares a circuit from the F—co line, over operated make and break contact 25 of relay A, operated make and break contact 27 of relay D, operated make and break contact 40 of relay C, and operated make and break contact 134 of relay B to the "B" line to which battery will be applied at the make contact 115' of the stop counting relay SC, Fig. 3, as the tenth restoration impulse is sent out. The current continues over the F—co line, Figs. 2 and 4, to the fractions cut-out relay FC with the result that no actuating impulses will be sent out over the F line as the new setting-up operation of the selected indicator assembly to being effected. As each of the price digit groups has a "B" line, it is obvious that any one or several or all of the indicators of the selected assembly or assemblies can be moved to the blank position and left there. If all of the indicators are to be left in the blank position, the release relay RLS—2 will be energized immediately upon grounding the line 55 over the contacts 53, 58, 61 and 130 of relays HC, TC, UC and FC which are energized simultaneously as the stop counting relay SC is energized as described above. The release relay RLS—2 clears the "no reset" and the price digit groups and impulses controlling the "no reset" group may immediately come in over the transmission channels R—1 and R—3.

*Transmitter*

A suitable form of transmitter is shown in Figs. 7, 8, 9, 10 and 11. Of these figures, Fig. 7 shows a keyboard, Fig. 8 shows two sets of groups of storage devices which may be alternately controlled from the keys and which may alternately control transmitting devices shown in Fig. 9 to control the impulses over the transmission channels R—1 and R—3.

Each of the alternate sets of storage devices in Fig. 8 comprises groups of relays, HS, TS, US, HP, TP, UP, FP, Ra, and a "no reset" group NR. Each of these groups, except the "no reset" group, is substantially of the form shown in Fig. 10, while the "no reset" group is shown in detail in Fig. 11.

The keyboard, Fig. 7, comprises ten digit keys which are used to store digits in the stock number selection groups, price digits groups and in the "range" group. The keyboard also comprises a blank key BL, a synchronizing key Syn and a "no reset" key NR.

The digit keys 1–10 and the blank key BL control storage mechanisms of the type illustrated in Fig. 10. The synchronizing key Syn controls a group of relays shown at the top of Fig. 8, which will be described later, and the "no reset" key NR controls a group of storage relays such as shown in Fig. 11.

Referring to Figs. 7 and 8 it will be noted that the four lines, *a*, *b*, *c* and *d*, extend from the keyboard to the groups of storage relays. As shown in Fig. 7, when the "1" key is depressed it applies ground to the line *a*, the "2" key applies ground to the line *c*, the "3" key applies ground to lines *a* and *c*, the "4" key applies ground to lines *a* and *d*, the "5" key applies ground to lines *b* and *c*, the "6" key applies ground to lines *a* and *b*, the "7" key applies ground to lines *c* and *d*, the "8" key applies ground to lines *a*, *b*, and *c*, the "9" key applies ground to lines *a*, *c* and *d*, and the "10" key applies ground to lines *b*, *c* and *d*. The BL key applies ground to lines *a*, *b*, *c* and *d*.

When the parts are in normal position, as shown in Fig. 8, the lines *a*, *b*, *c* and *d* are connected across the normal make and break contacts of relay Q to lines *a1*, *b1*, *c1* and *d1* which enter the hundreds stock number group HS—1, Fig. 8.

All of the stock number groups, price digit groups and range groups shown by rectangles, in Fig. 8, are substantially of the same construction detailed out in Fig. 10. For the purpose of tracing the circuits prepared in each of these groups the group shown in Fig. 10 will be regarded as the hundreds group of the stock selection groups of relays.

When the digit key "1" in Fig. 7 is depressed it applies ground to the coil of relay A*t*, Fig. 10, causing this relay to pick up. As the relay picks up it closes its make contact 150 and prepares a circuit over the coil of relay E*t* to the *z* line which, as shown in Fig. 8, is normally grounded over the break contact 151 of the relay R—1. The relay A*t* also closes its make contact 152 thereby connecting the GS line, Fig. 8, over the normal make and break contact 153 of relay SP—1 to the line A1 which, as shown in Fig. 9, is connected to contact 1 of the *hs* contacts of the rotary switch ARS. The GS line is adapted to be connected to ground over the make contact 181 of relay GO—1 and the interrupter *pi*, Fig. 9.

As the digit key "1" is released it removes ground from the circuit of the relay A*t*. The relay A*t* and the relay E*t*, act as a pair of counters and as the relay E*t* picks up its shifts the lines *a1*, *b1*, *c1* and *d1* through the connection shown to the tens stock number group TS—1. The relays A*t* and E*t* are now locked to the *z* line.

The following circuits will be traced out in the hundreds stock number group. If the digit key "2" is depressed the relay C*t* will be energized. As the relay C*t* picks up it closes a holding circuit over the coil of relay E*t* to the line *z* and, in addition, it prepares a circuit from the GS line across its make contact 154, across the normal make and break contact 155 of relay SP—1 to the line C1 which, in Fig. 9, is connected to the first contact of the *hs* contacts of the rotary switch CRS.

Depression of the digit key "3" causes the relays A*t* and C*t* to pick up and prepare circuits to the first of the *hs* contacts of the switch relays ARS and CRS.

Depression of the digit key "4" causes the A*t* and D*t* relays to pick up. The A*t* relay prepares a circuit to the first of the *hs* contacts of the rotary switch ARS and the D*t* relay prepares a circuit from the GS line over its make contact 156 to line D1 connected to the first of the *hs* contacts of the rotary switch DRS.

Depression of the digit key "5" causes the relays B*t* and C*t* to pick up. The relay B*t* prepares a circuit from the GS line over its make contact 157, over the make and break contact 158 of relay SP—2 to line B1 which is connected to the first of the *hs* contacts of the rotary switch BRS, Fig. 9. The relay C*t* prepares a circuit for the GS line over its make contact 154, over the normal make and break contact 155 of relay SP—1, to the line C1 which is the first of the *hs* contacts of the rotary switch CRS, Fig. 9.

Depression of the digit key "6" causes the relays A*t* and B*t* to pick up. The relay B*t* prepares a circuit from the GS line over its make contact 157, the normal make and break contact 158 of relay SP—2, to the B1 line which is connected to the first of the *hs* contacts of the rotary switch BRS, Fig. 9. The relay B*t* also prepares a circuit at its make contact 159 for the relay SP—1 which circuit is completed at the operated make and break contact 160 of relay A*t*. The circuit prepared by the relay A*t* from the GS line, over its make contact 152, is now extended over the operated make and break contact 153 of relay SP—1 to the line A2 which, in Fig. 9, is connected to the second of the *hs* contacts of the rotary switch ARS.

Depression of the digit key "7" causes the relays C*t* and D*t* to pick up. The relay D*t* prepares a circuit from the GS line to the first of the *hs* contacts of the rotary switch DRS, Fig. 9, as before described. The relay D*t* also prepares at its make contact 161 a circuit for the relay SP—1 which is completed at the make contact 162 of relay C*t*. The relay C*t* prepares a circuit from the GS line over its make contact 154, over the operated make and break contact 155 of relay SP—1, the line C2 which is connected to the second of the *hs* contacts of the rotary switch CRS, Fig. 9.

Depression of the digit key "8" causes the relays A*t*, B*t* and C*t* to pick up. The relay B*t* prepares a circuit from the GS line to the B1 line which is connected to the first of the *hs* contacts of the rotary switch BRS. Energization of the relays A*t* and B*t* causes the relay SP—1 to pick up, as described before, so that the relay A*t* will prepare a circuit from the GS line to the line A2 which is connected to the second of the *hs* contacts of the rotary switch ARS, Fig. 9. The relay C*t* prepares a circuit from the GS line to the C2 line which is connected to the second of the *hs* contacts of the rotary switch CRS, Fig. 9.

Depression of the "9" key causes the relays A*t*, C*t*, and D*t* to pick up. The relay D*t* prepares a circuit from the GS line to the D1 line which is connected to the first of the *hs* contacts of the rotary switch DRS, Fig. 9. The relays D*t* and C*t* through their contacts 161 and 162 apply ground to the relay SP—1 which picks up and causes the circuit prepared from the GS line by the relay A*t* to be extended to the A2 line which is connected to the second of the *hs* contacts of the rotary switch ARS, Fig. 9. Energization of the relay SP—1 also causes the circuit prepared by the relay C*t* to be connected to the C2 line which is connected to the second of the *hs* contacts of the rotary switch CRS, Fig. 9.

Depression of the digit key "10" causes the relays B*t*, C*t* and D*t* to pick up. The relay D*t* prepares a circuit from the GS line to the D1 line which is connected to the first of the *hs* contacts of the rotary switch DRS, Fig. 9. The relays C*t* and D*t* through their make contacts 162 and 161 cause the relay SP—1 to pick up. These relays in combination with the relay B*t* apply ground to the relay SP—2, the circuit extending over the normal make and break contact 160 of relay A*t*, the operated make contact 159 of relay B*t*, the make contact 162 of relay C*t* and the make contact 161 of relay D*t*. The circuit prepared from the GS line by the relay B*t* is extended over the operated make and break contact 158 of relay SP—2 to the B2 line which is connected to the second of the *hs* contacts of the rotary switch BRS, Fig. 9. The circuit prepared from the GS line by the C*t* relay extends over the operated make and break contact 155 of relay SP—1 to the C2 line which is connected to the second of the *hs* contacts of the rotary switch CRS.

Depression of the BL key causes the relays A*t*, B*t*, C*t* and D*t* to pick up. The relay D*t* prepares a circuit from the GS line to the D1 line which is connected to the first of the *hs* contacts of the rotary switch DRS, Fig. 9. The B*t* relay prepares a circuit from the GS line to the B1 line which is connected to the first of the *hs* contacts of the rotary switch BRS, Fig. 9. As the relays C*t* and D*t* pick up they close the energizing circuit for the relay SP—1. The circuit prepared from the GS line by the relay A*t* is connected to the A2 line which is connected to the second of the *hs* contacts of the rotary switch ARS, Fig. 9. The circuit prepared by the relay C*t* from the GS line is connected to the C2 line which is connected to the second of the *hs* contacts of the rotary switch CRS, Fig. 9.

It we assume now that a set-up is to be made in the groups of relays on the right hand side in Fig. 8 the digit key corresponding to the hundreds stock number HS—1 is depressed and circuits are prepared from the GS line to the rotary switches in Fig. 9, as described above, and the various relays A*t*, B*t*, C*t* and D*t* that were picked up are connected to the *z* line. After the key has been released the locking circuit for these relays is extended over the coil of the switching relay E*t* which picks up and disconnects the a1, b1, c1 and d1 lines from the hundreds stock number group and connects them to the tens stock number group TS—1. The lines a1, b1, c1 and d1, Fig. 8, are designated 1, 2, 3 and 4 where they enter a group of relays and 5, 6, 7 and 8 where they leave a group. The letters A, B, C, D indicate that current on these lines sets up a control which causes the relays A, B, C and D in the receiver to pick up during transmission. The next depression of a digit key will cause circuits to be prepared in the tens stock number group TS—1. When the key is released the a1, b1, c1 and d1 lines will be shifted to the units stock number group US—1. The units stock number is now indexed on the keys which prepares circuits from the GS line across the switches in the units stock number group US—1 to the rotary switches, in Fig. 9, and shifts the lines $a1$, $b1$, $c1$ and $d1$ to the hundreds price digit group HP—1.

If the hundreds, tens, units and fractions indicator wheels are to be reset the operator will next depress the digit key corresponding to the hundreds price and prepare circuits from the GS line across the hundreds price digit group to the rotary switches in Fig. 9. The tens, units and fractions digits will be indexed on the keyboard in succession and circuits will be prepared from the GS line to rotary switches in Fig. 9 as is now understood.

If the price change occurs only in the fractions position the lines $a1$, $b1$, $c1$ and $d1$ may be switched from the units stock number group to the fractions price digit group so that depression of the numeral key after the units stock number has been entered will control the fractions price digit group FP—1, and no controls will be set up in the hundreds, tens and units price digit groups. Similarly, a control may be set up so that only the units and fractions price digits will be changed, or that only the tens, units and fractions price digits will be changed. This control is effected by the group of relays diagrammatically illustrated by rectangles in Fig. 8 and designated NR—1 and NR—2 and also designated by the words "no reset."

*No reset group of relays*

As shown in Fig. 7, the keyboard is provided with a key NR which applies ground to line $nr$ which, as shown in Fig. 11, is extended across the normal make and break contact 165 of relay HE to one terminal of the relay HNR to the other terminal of which are applied battery and ground. This causes the relay HNR to pick up and at its make contact 166 to prepare a circuit from battery over its own coil and the coil of relay HE to the $z$ line. As the key NR is released the relay HE picks up in series with the relay HNR. The relay HNR connects battery over its make contact 167 to the line $hn$ which extends into the hundreds price digit group of relays and which line is indicated in Fig. 10 as the energizing line for the relay E$t$. As the relay E$t$ picks up it switches the lines $a1$, $b1$, $c1$ and $d1$ from the hundreds price digit group to the tens price digit group so that impulses coming in over the lines $a1$, $b1$, $c1$ and $d1$ will not set up any information in the hundreds price digit group but will set up information in the tens price digit group. The relay HE switches the line $nr$ at its operated make and break contact 165 to a line connected over the normal make and break contact 168 of relay TE to one terminal of the relay TNR to the other terminal of which battery and ground are connected.

As shown in Fig. 11, the GS line is normally connected over a make and break contact 169 of relay UE, make and break contact 170 of relay TE, make and break contact 171 of relay HE to the D$re$ line which, in Fig. 9, is shown connected to the $re$ contact of the rotary switch DRS which, as will be described later, will during transmission to the receiver cause the relay D in the "no reset" group to be energized which switches the lines from the "no reset" group of relays to the "range" group of relays, that is, if the NR key is not depressed the machine will normally be controlled to change all the hundreds, tens, units and fractions indicators.

As the relay HE, before referred to, picks up it disconnects the line D$re$ from the GS line and connects this line to one terminal of the slow-to-release relay A$n$, the other terminal of which is connected to battery and ground so that this relay will pick up when impulses are sent over the GS line. The relay AN at its make contact 172 also connects the GS line to the line A$re$ which, in Fig. 9, is connected to the $re$ contact of the rotary switch ARS.

If the NR key is depressed a second time a circuit will be completed over the TNR relay from battery over the coil of relay, over the normal make and break contact 168 of relay TE, the operated make and break contact 165 of relay HE and the line $nr$ to ground. The relay TNR picks up and at its contact 173 prepares a holding circuit over the coil of relay TE to the $z$ line. When the NR key is released the relays TNR and TE will pick up in series and the relay TE will switch the circuit connections from the line $nr$ to the relay UNR so that the next impulse over the line $nr$ will energize the relay UNR. As the relay TNR picks up it applies battery over its make contact 174 to the $tn$ line which is connected over the coil of the relay E$t$ of the tens price digit group to the $z$ line. As the relay E$t$ picks up it switches the lines $a1$, $b1$, $c1$ and $d1$ to the units price digit group of relays UP—1. The relay TE also prepares a circuit from the GS line over its operated make and break contact 170 to one terminal of the coil of the slow-to-release relay CN to the other terminal of which are applied battery and ground. This causes the relay CN to pick up during transmission as impulses are sent over the GS line. As the relay CN picks up it connects the GS line at its make contact 175 to the line C$re$ which is connected to the contact $re$ of the rotary switch CRS, Fig. 9. Operation of the contact 170 disconnects the relay AN from the GS line.

If it is desired to prevent a setting-up operation in the units price digit groups the NR key is depressed a third time which causes the relay UNR to pick up and at its contact 176 to prepare a holding circuit for itself and the relay UE to the $z$ line. The relay UE picks up and at its make and break contact 169 connects the GS line to one terminal of the coil of the slow-to-release relay DN to the other terminal of which are applied battery and ground. When the relay DN picks up during transmission it connects the GS line at its make contacts 177 and 178 to the lines A$re$ and C$re$ which are connected to the $re$ contacts of the rotary switches ARS and CRS, Fig. 9. As the relay UNR picks up it applies ground over its make contact 179 to the line $un$ which, as indicated in Figs. 8 and 10, causes the relay E$t$ of the units price digit group to pick up and switch the line $a1$, $b1$, $c1$ and $d1$ to the fractions price digit group. Operation of the contact 169 disconnects the relay CN from the GS line.

After the "no reset" information has been set up under the control of the NR key, and which control must be set up before any of the price digit information is set up, the digit keys are depressed to set up the new price in the price digit groups of relays. After the fractions price digit group has been set up the relay E$t$ in this group will switch the lines $a1$, $b1$, $c1$ and $d1$ to the "range" group indicated in Fig. 8 as R$a$—1 and R$a$—2.

As the digit keys 1 to 9 and 0 are used to set up the stock number 1 to 9 and 10, the price digits which may involve fractions, and the range in the "range" group, it is desirable to provide these keys with captions such as indicated in Fig. 7. For example, the "1" key which is used to set up the "1" digit in the stock number groups and the hundreds, tens and units price digit groups, is also used to set up the fraction 1/8 in the fractions price digit group and to select the "last" range in the "range" group. This key is therefore provided with the captions "1", "1/8" and "La". The captions on the other keys will be readily understood by reference to the pulse code before referred to.

The range, or ranges, in which it is desired to change the prices are set up by depression of the proper keys to prepare circuits from the GS line to the "range" contacts associated with the rotary switches in Fig. 9 and designated as ra—1 and ra—2 to cause the transmission of impulses as shown in the pulse code. The hundreds, tens, units and fractions price contacts associated with the rotary switching relays are suitably designated as hp1 and 2, tp1 and 2, up1 and 2, and fp1 and 2.

Transmission

After the range group of relays has been controlled and the key has been released ground is applied over the make contact 180 of the relay Et in this group to the line GO which is shown in Fig. 8 as the ground line for the relay GS—1. As this relay picks up it connects the GS line at its contact 181 to the line p which is adapted to be grounded intermittently over the interrupter pi, Fig. 9. This interrupter, together with a second interrupter ai later referred to, may be driven by any suitable motor not shown. As the interrupter pi rotates it applies ground intermittently to the line GS which is connected over the various groups of relays to the various contacts associated with the rotary switches shown in Fig. 9. The relay GS—1 also applies ground at its make contact 182 to line 183 which is connected over a break contact 184 of relay O to a line pa which, as shown in Fig. 9, is connected across the coil of the actuating magnet AM to the interrupter ai to which battery and ground are applied. As the interrupter ai rotates it energizes the magnet AM which, through its armature 185 and pawl 186, steps the ratchet 187 ahead. This ratchet 187 is mounted on a shaft to which are secured the double arms of the rotary switches ARS, BRS, CRS, DRS and LS. Each energization of the magnet AM causes the rotary switches to move ahead one step. As the interrupter ai breaks the circuit of the operating magnet AM the interrupter pi applies ground to the line p which is connected to the line GS which, in turn, is connected through the various groups of relays to the respective contacts of the rotary switches ARS, BRS, CRS and DRS. As the double arms of the rotary switches ARS, BRS, CRS and DRS are now in contact with the first of the hs contacts circuits will be prepared from battery across the coils of relays AR, BR, CR and Dr and lines ar, br, cr and dr, and across the double arms of the rotary switches ARS, BRS, CRS and DRS to the first of the hs contacts and from certain of the hs contacts across the group of relays HS—1 to the GS line to the p line and across the interrupter pi to ground as the interrupter grounds the line p.

If, at this time, the first of the hs contacts of the ARS switch is connected to the GS line as in the case where "1" was registered in the HS—1 group, the relay AR, Fig. 9, will pick up and close a circuit from ground and the positive side of the battery across a make contact 190 of relay AR to the transmission channel R—1 which is extended over the coils of the polarized relays in stations S—1, S—2, ... SN. A positive impulse over the transmission channel R—1, according to the pulse code, causes energization of the relay A in the hundreds stock number group HSN, Fig. 1. This connects the "1" digit line in the hundreds stock number group to the CO line and causes the circuit connections 13, 14, 15 and 16 to be switched to the tens stock number group TSN. As the interrupter ai continues it steps the switches another step ahead over the second of the hs contacts. Since it is assumed that the number "1" was set up in the HS—1 group none of the second of the hs contacts are connected to the GS line.

If the number "2" is set up in the HS—1 group then the first of the hs contacts of the CRS switch will be connected to the GS line and in the first position of the switches the relay CR will be energized which will close its contact 191 and cause a positive impulse to go out over the transmission channel R—3 which will cause the relay C in the HSN group, Fig. 1, to pick up and connect the "2" digit line to the CO line.

If it is assumed that the number "6" was set up in the HS—1 group then circuits are prepared from the GS line to the first of the hs contacts associated with the BRS switch and to the second of the hs contacts associated with the ARS switch. As the switch arm BRS contacts with the first of the hs contacts it causes the relay BR to pick up which closes its make contact 192 and causes a negative impulse to go out over the transmission channel R—1 which will cause the relay B in the HSN group, Fig. 1, to pick up. This relay B locks directly to the line L and does not shift the circuits from the HSN group to the TSN group. As the switch arms are moved to the second of the hs contacts the switch arm of the rotary switch ARS completes the energizing circuit for the AR relay which, as described before, will cause a positive impulse to be transmitted over the transmission channel R—1 which causes the relay A in the HSN group, Fig. 1, to pick up. As the impulse ceases the relay E of the HSN group will pick up and switch the lines 13, 14, 15, 16 to the TSN group.

If we assume that the numeral "7" was set up in the HS—1 group then the first of the hs contacts of the rotary switch DRS will be connected to the GS line and the second of the hs contacts of the rotary switch CRS will be connected to the GS line. As the switch arms are moved to their first position the arm of the rotary switch DRS will complete an energizing circuit for relay DR which will close its contact 193 and cause a negative impulse to be sent out over the transmission channel R—3 which will cause the relay D in the HSN group, Fig. 1, to pick up and to lock directly to the line L. As the switch arms move to the second of the hs contacts the switch arm of the CRS rotary switch will complete the energizing circuit for the CR relay which as before will cause a positive impulse to be sent out over the transmission channel R—3 to cause the relay C in the HSN group, Fig. 1, to pick up. As the second impulse is taken off the relay E associated with the HSN group will pick up and switch the lines 13, 14, 15 and 16 from this group to the TSN group.

The manner in which the remaining digit lines in the HSN group are connected to the CO line under the control of the HS—1 group, Fig. 8, and rotary switches, Fig. 9, will be apparent from a consideration of the pulse code and of the description of the group of relays in Fig. 10.

In the third and fourth positions of the rotary switches the relays in the tens stock number group TSN, Fig. 1, will be set up under the control of the TS—1 group, Fig. 8.

The relays in the USN group, Fig. 1, will be energized under control of the US—1 group, Fig. 8, as the rotary switches make contact with the fifth and sixth positions.

The relays of the "no reset" group, Fig. 1, will be energized under control of the "no reset" group NR—1, Fig. 8, when the rotary switches ARS, CRS and DRS are in the seventh position.

The group of "range" relays marked "Range," Fig. 1, will be energized under control of the "range" group Ra—1, Fig. 8, when the rotary switches are in the eighth and ninth positions.

The price digit relays HPD, TPD, UPD and FPD, Fig. 1, will be controlled, respectively, by the relays HP—1, TP—1, UP—1 and FP—1, Fig. 8, when the rotary switches are, respectively, in the tenth and eleventh, twelfth and thirteenth, fourteenth and fifteenth, and sixteenth and seventeenth positions.

As the relay GS—1, Fig. 8, was energized at the time that the "range" group was controlled it started the transmission by connecting the GS line to the p line, as before described. As the rotary switch LS, Fig. 9, is stepped ahead it applies ground to a relay OR. This relay picks up and applies ground over its make contact 194 to line o connected over the coil of relay O to battery and ground. The relay O picks up and applies ground over its contact 195 to the La line which is the ground line for the lamp L on the keyboard. The relay OR also applies ground at its make contact 196 to the line pa to supply ground for the circuit of the operating magnet AM, after the ground has been removed at contact 184 by energization of the relay O.

After the transmission has ceased the rotary switch arm LS will apply ground to a line r which, as shown in Fig. 4, is connected to a contact 197 of the relay Q the circuit for which was completed over a make contact 198 of the relay GS—1, at the time transmission was begun. The circuit continues over the operated make and break contact 197, over the coil of relay R—1 to battery and ground thus disconnecting the z line of the right hand group of relays in Fig. 8 from ground and causing all of the relays of this group to release immediately after the transmission which they controlled has been completed.

As the switch arm LS moves off the contact connected to the line r and the relay R—1 is deenergized, the z line of the right hand group of relays is again connected to the ground.

As the transmission was started under the control of the right hand group of relays, Fig. 8, and as Q was energized as described, it disconnected the lines a, b, c and d from the lines a1, b1, c1 and d1 and connected them to the lines a2, b2, c2, and d2 so that the group of relays on the left hand side of Fig. 8 may be energized at the time transmission is taking place under control of the relays on the right hand side of the figure.

The relay Q is maintained energized until the GO line in the Ra—2 group has been grounded and the relay GO—2 energized. As the relay GO—2 picks up it connects the pulsing line p at its make contact 198 to the GS line for the group of relays at the left hand side of Fig. 8. At its make contact 199 it applies ground to the line 183 which is connected to the pulsing line pa immediately after deenergization of the relay O under control of the rotary switch LS. This starts transmission under control of the group of relays at the left hand side of Fig. 8.

The relay GO—2 also applies ground at its contact 200 over the contact 201 of relay Q to the coil of relay Q. As the coils of the relay Q are wound in opposite directions and as both are now connected to ground and to battery the relay Q will release and through its make and break contacts connect the lines a, b, c, and d to the lines a1, b1, c1 and d1 so that information may be set up in the right hand group of relays at the time that transmission takes place under control of groups of relays at the left hand side of the figure. The relay Q also connects the line nr to the lines nr1, nr2, at the same time that it connects the lines a, b, c and d to the corresponding groups of relays at the right and left of Fig. 8.

The relay OR, Fig. 9, is made slow to release so that the lamp La will remain energized until the rotary switches have made three additional steps necessitated by the fact that restoration and setting-up operations of indicators may require twenty impulses while transmission never requires more than seventeen impulses. After deenergization of the lamp, the operator may set up the range and start transmission of information as to another stock.

Synchronizing means

As shown in Fig. 7 the keyboard is provided with a synchronizing key Syn which applies ground to a slow-to-release relay As and a relay BS, both of which are connected to battery and ground. The relay BS picks up and applies ground at its contact 206 to a line which is connected over the break contact 207 of relay CS to a line bs which, as shown in Fig. 9, is connected to the ground line of the relay BR. This relay, as described before, causes a negative impulse to be sent over the transmission channel R—1 which causes a relay B in any of the groups of relays in Figs. 1 and 2 to pick up. The relay B closes a holding circuit to the line L.

The relay BS, Fig. 8, at its contact 208 prepares a circuit over the coil of relay CS and the make contact 209 of relay AS to ground. As the key Syn is released to remove ground from the AS and BS relays the relay CS comes up in series with the relay BS before the relay AS releases. As the relay CS picks up it opens the ground circuit for the relay BR at its contact 207 and applies ground at its contacts 210 and 211 to the lines as and ds which, as shown in Fig. 9, are connected to the ground lines of the relays AR and DR. Relay AR causes a positive impulse to be transmitted over the transmission channel R—1 and the relay DR causes a negative impulse to be transmitted over the transmission channel R—3, and these impulses will cause relays A and B of any one of the groups of relay in Figs. 1 and 2 to pick up. As described before, when the relays A, B and D in any of the groups of relays in Figs. 1 and 2 are picked up they will cause energization of the release relays RLS—1 and RLS—2 which clears all the relays of the receiving mechanism shown in Figs. 1 to 6.

The synchronizing key may be depressed when the rotary switches in Fig. 9 are in the position indicated regardless of the position of the mechanism in the receiving mechanism.

Operation

In this statement of operation it is assumed that a stock AXT (stock number 348) previously quoted at 289⅝ is now quoted at 290, and that this is a new "high." It is also assumed that the transmitter and various receivers are in the normal position shown in the drawings.

As there is no change in the hundreds position and, moreover, as the "last" and "high" ranges have no hundreds indicators the NR key will be depressed once to switch the $a1$, $b1$, $c1$, $d1$ lines from the US—1 group, Fig. 8, to the TP—1 group and to connect the GS line to the ground terminal of the slow-to-release relay AN, Fig. 11, which will pick up and remain up as impulses are transmitted over the GS line and which will connect the GS line to the Are line which is connected to the contact re of the rotary switch ARS, Fig. 9, to cause energization of the relay A in the "no reset" group at the proper time during transmission.

The "3" digit key will be depressed next. This connects the GS line through the HS—1 group, Fig. 8, to the first of the $hs$ contacts of the rotary switches ARS and CRS, and switches the lines $a1$, $b1$, $c1$, $d1$ to the TS—1 group.

Depression of the "4" digit key connects the line GS through the group TS—1 to the first of the $ts$ contacts of the rotary switches ARS and DRS and switches the lines $a1$, $b1$, $c1$, $d1$ to the US—1 group.

Depression of the "8" digit key connects the GS line over the US—1 group to the first of the $us$ contacts of the rotary switch BRS and to the second of the $us$ contacts of the rotary switches ARS and CRS and switches the lines $a1$, $b1$, $c1$, $d1$ to the HP—1 group from which they have been switched to the TP—1 group under control of the NR—1 group.

Depression of the "9" digit key connects the GS line across the TP—1 group to the first of the $tp$ contacts of the rotary switch DRS and to the second of the $tp$ contacts of the rotary switches ARS and CRS and switches the lines $a1$, $b1$, $c1$, $d1$ to the UP—1 group.

Depression of the "10" digit key connects the GS line across the UP—1 group to the first of the up contacts of the rotary switch DRS and to the second of the $up$ contacts of the rotary switches ARS and CRS.

Depression of the blank key BL connects the GS line across the FP—1 group to the first of the $fp$ contacts of the rotary switches BRS and DRS and to the second of the $fp$ contacts of the rotary switches ARS and CRS and switches the lines $a1$, $b1$, $c1$, $d1$ to the Ra—1 group.

As the new quotation is a "last" and is assumed to be a "high" the "3" digit key is depressed which connects the GS line across the Ra—1 group to the first of the $ra1$ contacts of the rotary switches ARS and CRS and across the GO line, Fig. 10, which causes the GO—1 relay to pick up and start the transmission by energizing the rotary switch operating magnet AM, Fig. 9. It also applies ground to the energizing circuit of the Q relay, Fig. 8, which disconnects the lines $a$, $b$, $c$, $d$ from the $a1$, $b1$, $c1$, $d1$ lines and connects them to the $a2$, $b2$, $c2$, $d2$ lines so that information as to another stock may be set up in the "2" groups of relays as the "1" groups control the transmission.

Circuits have been prepared from the GS line to the contacts of rotary switches, Fig. 9, and from the interrupter $pi$, Fig. 9, to the GS line across the make contact of the GO—1 relay, as shown in the following table.

| Information | Contacts | Switches | | |
|---|---|---|---|---|
| Stock number: | | | | |
| 3 | $hs$ 1 | ARS | CRS | |
| | 2 | | | |
| 4 | $ts$ 1 | ARS | | DRS |
| | 2 | | | |
| 8 | $us$ 1 | | BRS | |
| | 2 | ARS | CRS | |
| No reset: $h$ | $re$ 1 | ARS | | |
| Range: Hi la | $ra$ 1 | ARS | CRS | |
| | 2 | | | |
| Price digit: | | | | |
| 9 | $tp$ 1 | | | DRS |
| | 2 | ARS | CRS | |
| 0 | $up$ 1 | | | DRS |
| | 2 | | BRS CRS | |
| Blank | $fp$ 1 | | BRS | DRS |
| | 2 | ARS | CRS | |

Whenever an impulse is sent across the contacts and arms of the rotary switch ARS a resultant positive impulse will be sent over the transmission channel R—1 to the receiving station. An impulse across the BRS switch will cause a negative impulse to be sent over the transmission line R—1. An impulse over the CRS switch will cause a positive impulse to be sent over the transmission channel R—3. An impulse over the DRS switch will cause a negative impulse to be sent over the transmission channel R—3.

When the parts are in the position shown in the drawings the lines 13, 14, 15, 16, Fig. 1, will be connected across the normal make and break contacts of the relay E of the HSN group to the energizing leads of the relays of this group.

As the rotary switches, Fig. 9, are stepped ahead the switch arms will make contact with the associated contacts in the order given in the table above.

As shown in Fig. 9, the first impulse over the $pa$ line will step the switch arms ahead to the first of the $hs$ contacts. Immediately thereafter the interrupter $pi$ will complete the circuits for the relays AR, BR, CR and Dr, Fig. 9, over the first of the $hs$ contacts that may be connected across the stocks number selector groups HS—1, TS—1, and US—1, Fig. 8, to the GS line to which the impulsing line $p$ is connected.

In the operation assumed, and as shown in the table above, in the first position of the switches in which the first of the $hs$ contacts of the rotary switches ARS and CRS will be connected to ground across the interrupter $pi$, the relays AR and CR will pick up which causes positive impulses to be sent simultaneously over the transmission channels R—1 and R—3 which will cause the relays A and C, Fig. 1, of the HSN group to pick up and to connect the "3" line to the CO line and to switch the lines 13, 14, 15, 16 from the HSN group to the TSN group.

No impulses will be sent out over the transmission channels R—1 and R—3 when the switch arms are on the second of the $hs$ contacts as none of these contacts are connected to the GS line.

When the switching arms are on the first of the $ts$ contacts relays AR and DR will be energized causing a positive impulse on the transmission channel R—1 and negative impulse on the transmission channel R—3 which cause the relays A and D of the TSN group, Fig. 1, to pick up and connect the "4" line to the CO line and switch the lines 13, 14, 15, 16 from this group to the USN group.

When the switches are in contact with the second of the ts contacts no impulses will be sent over the transmission channels as none of these contacts are connected to the GS line.

When the switches are on the first of the us contacts the relay BR will be energized to cause a negative impulse to be sent over the transmission channel R—1 which will cause the relay B in the USN group, Fig. 1, to pick up and to lock to the line L. When the switch arms are on the second of the us contacts the relays AR and CR will pick up and cause transmission of a positive impulse over the transmission channel R—1 and a positive impulse over the transmission channel R—3 which will cause the relays A and C in the USN group to pick up and the lines 13, 14, 15, 16 to be switched from this group to the "no reset" group. Energization of the relays B, A and C connects the "8" line to the CO line.

As the switches are stepped ahead to the re contacts relay ARS will pick up causing a positive impulse to be transmitted over the transmission channel R—1 to the "no reset" group, Fig. 1, which causes the relay A to pick up and to apply battery to the Nh line which, as shown in Fig. 2, is connected over the coil of relay E of the HPD group to the line L' which is the locking line for the groups of relays shown in Fig. 2. The line Nh is also connected to the coil of the hundreds cut-out relay HC, Fig. 4, to disconnect the interrupter HP from the hundreds impulsing line H. The relay HC locks to the line L" to which battery is applied as long as the release relay RLS—2 is deenergized. The line L' is grounded across the contact of the release relay RLS—2 so that all the relays in Fig. 2 when energized will remain energized until the relay RLS—2 is energized.

As the impulse which caused the relay A in the "no reset" group to pick up terminates the relay E picks up over the line L which is the locking line for all of the relays in Fig. 2 and which is grounded over the normal break contact of the relay RLS—1, Fig. 2.

As relay E picks up its switches the lines 13, 14, 15, 16 from the "no reset" group to the "range" group. It also applies battery to the CO line which has been connected across the "range" groups HSN, TSN and USN, respectively, to the digit lines 3, 4, and 8 so that the circuit continues over the HSN group to the HSN—3 relay, Fig. 5. This circuit continues across the USN group to the USN—8 relay of the groups of relays USN—1 to USN—10, Fig. 5. The current also continues across the TSN group to the "4" line which is connected across the energized relay HSN—3 to a line which is multipled across the relay USN—8 which is the energizing lead for the GSR relay, Figs. 4 and 6, corresponding to the stock number "348." As the relay GSR picks up it locks to the locking line L". The stock number group has now been selected and the actuating line H has been disconnected from the interrupter HP and the lines 13, 14, 15, 16 have been switched from the HPD group to the TPD group of relays, Fig. 2.

In the transmitter the rotary switches have been stepped ahead and are now over the first of the ra contacts of which the contacts in the ARS and CRS switches have been connected to the GS line. The relays AR and CR will pick up and transmit positive impulses over the transmission channels R—1 and R—3 to the "range" group which causes the relays A and C to pick up and connect the "3" line to the CO line which is now energized. The current on the "3" line will continue to the HL relay, Fig. 4, which controls the energization of the relays Hi and La. As these relays pick up they lock to the line L" and connect the impulsing lines T, U, F to the bus lines t, u and f leading to the "high" and "last" indicators. Circuits have now been prepared from the interrupters TP, UP and FP, Fig. 4, across the impulsing lines T, U and F and to the "high" and "last" indicators of the group of indicators designated AXT represented by the stock number "348."

The E relay in the "range" group switches the lines 13, 14, 15, 16 to the HPD group, Fig. 2, in which they have been switched to the TPD group so that the next impulses over the transmission channels R—1 and R—3 will control the relays of the TPD group.

The relay E of the "range" group also completed the circuit for the start restoring relay SR, Fig. 2, which applies battery to the line 75, Fig. 3, which battery continues across the auxiliary interrupter AUX, Fig. 4, to the start pulsing relay SP, Fig. 3, which locks up to the line 77 which line is connected to the line 75. The start pulsing relay SP applies battery to the line 81 which is multipled across the interrupters CP, HP, TP, UP and FP. As these interrupters rotate impulses will be transmitted across the lines T, U and F, to the selected indicators to move these indicators ahead one step. At the same time, the interrupter CP sends an impulse across the line 82 to the chain of counting relays, Fig. 3. The impulses sent to the indicators will continue to move these indicators ahead step by step until they reach the blank position when the restoration ground RG, Fig. 4, will be automatically cut out so that the indicators will remain in the blank position. The interrupters in Fig. 4 will continue to open and close circuits until the impulses over the line 82 from the interrupter CP have operated the counting chain of relays, Fig. 3, to connect line 110 with the line 112 which is connected across the normal make and break contact 113 of the wipe-out WO relay to the energizing lead 113' of the stop counting relay SC. Relay SC picks up and removes battery from the counting chain so as to normalize this mechanism. The relay SC also closes the energizing circuit for the relay CI, Fig. 4, which applies ground to the actuation ground line Ag and also applies ground to the circuit for the start actuating relay SA, Fig. 3. This relay connects the line 75 to the line 77 and connects the line 111 to the "10" line.

As stated before, the restoration of the selected indicators was started at the time the range selection was made. The transmission from the transmission station continued and after the transmission of the range information, which is all transmitted over the first of the ra contacts, the rotary switch arms will be in contact with the first of the hp contacts. As no change is to be made in the set up of the hundreds indicator none of these contacts were connected to the GS line.

The switches are stepped ahead until they are in contact with the first of the tp contacts of which the contact in the DRS switch will cause the relay DR, Fig. 9, to pick up which causes transmission of a negative impulse over transmission channel R—3. This causes the relay D in the TPD group, Fig. 2, to pick up and to lock to the line L'. The rotary switches are stepped to the second of the *tp* contacts and the impulses over the contacts of the switches ARS and CRS will cause the relays AR and CR to pick up and to transmit positive impulses over the transmission channels R—1 and R—3 which will cause the relays A and C in the TPD group to pick up. The relays AC and D connect the T—*co* line to the "9" line to which battery is adapted to be applied by the counting chain mechanism in Fig. 3 when the ninth impulse is sent out to the indicator.

After the relay CI, Fig. 4, is energized the line T—*co* will be connected to the energizing line for the TC relay, the purpose of which will be described later. As the second impulse controlling the TPD group ceases the relay E associated with this group will switch the lines 13, 14, 15, 16 to the UPD group.

The rotary switches in Fig. 9 have been stepped ahead and now are over the first of the up contacts of which the "1" in the DRS switch is connected to the GS line so that the relay DR will pick up and cause the transmission of a negative impulse over the transmission channel R—3 which will cause the relay D in the UPD group, Fig. 2, to pick up and to lock to the line L'.

When the rotary switches are over the second of the *up* contacts relays BR and CR will be energized and will cause a negative impulse to be sent over the transmission channel R—1 and a positive impulse over the transmission channel R—3 which will cause the relays B and C of the UPD group, Fig. 2, to pick up and switch the lines 13, 14, 15, 16 from this group to the FPD group. Energization of the relays D, B and C connected to the "10" line to the U—*co* line which was connected by the relay CI to the energizing lead of the relay UC, Fig. 4. The "10" line is adapted to have battery applied to it by the counting chain mechanism in Fig. 3 as the tenth impulse is being transmitted to the selector indicators.

As the rotary switches are stepped ahead to the first of the *fp* contacts the relays BR and DR will be energized and, respectively, cause the transmission of negative impulses over the transmission channels R—1 and R—3 which will cause the relays B and D of the FPD group, Fig. 2, to operate.

When the switch arms are over the second of the *fp* contacts the relays AR and CR will pick up and cause the transmission of positive impulses over the transmission channels R—1 and R—3 which cause the relays A and C of the FPD group to pick up. Energization of the relays A, B, C and D connects the F—*co* line which is the energizing lead for the FC relay, Fig. 4, to the B line to which battery is adapted to be applied upon energization of the stop counting relay SC.

As the relay E of the FPD group picks up it completes the circuit for the release relay RLS—1 which removes ground from the locking line L to release all of the relays in Fig. 1.

In the meantime, information as to another stock may have been set up in the "2" group of relays, Fig. 8, and when the "range" information is set up in this group it will start transmission under the control of this group and also switch the lines *a*, *b*, *c* and *d* to the "1" group.

The transmission from the "2" group, Fig. 8, may take place immediately after the locking line L, Fig. 1, is again connected to ground and this connection is made when the energizing circuit for the release relay RLS—1 is broken at the break contact of the relay RR, Fig. 2, which is energized at the time that the CI relay is energized, Fig. 4, which as stated before is energized at the time that the stop counting relay SC is energized after ten restoration impulses have been sent to the indicators.

Transmission to the HSN, TSN and USN groups may be made during the time that the selected indicators are actuated under control of the groups of relays in Fig. 2.

In the operation assumed no change is to be made in any hundreds indicators and the H actuating line is disconnected from its interrupter by the relay HC which is locked to the line L" and remains locked during the whole operation of setting the indicators forwardly.

Actuation

Actuation impulses are now sent out in succession in the same manner in which restoration impulses were sent out. To move the tens and units indicators from the blank position to the desired new setting an impulse is first sent out over each of the lines T and U to move the tens and units indicators ahead one step. Immediately thereafter, an impulse over the interrupter CP causes the counting chain, Fig. 3, to connect battery to the "1" digit line which, as well as the other digit lines, is multipled across the price digit groups of relays, Fig. 2, to the H—*co*, T—*co*, U—*co* and F—*co* lines which are the energizing lines for the cut-out relays HC, TC, UC and FC, Fig. 4. None of these relays will be energized as the "1" line is not connected to any of the *co* lines.

No actuation impulses are sent out over the H line as the H line is not connected to the *h* bus lines and, moreover, the relay HC was operated under control of the "no reset" group.

No actuation impulses will be sent out over the F line as the B line to which battery was applied by the "stop counting" relay SC at the time restoration was completed was connected across the FPD relays, Fig. 2, to the F—*co* line and energized the FC relay, Fig. 4, disconnecting the F line from the interrupter FP.

The second impulse goes out and steps all the selected tens and units indicator wheels to the "2" position and in the counting chain battery is applied to the "2" line which is not connected across any of the relays in Fig. 2. Impulses will continue to be sent out to the indicators and after the ninth impulse has been sent out the counting chain will connect battery to the "9" line which is connected across the TPD relay to the T—*co* line which causes the relay TC to pick up and disconnect the T line from the interrupter TP so that no further impulses will be sent to the tens indicators.

After the next impulse has gone out to the units indicators a circuit will be completed in the counting chain from battery to the "10" line and across the UPD relays to the U—*co* line to energize the relay UC, Fig. 4, to disconnect the U line from the impulse interrupter UP so that no further impulses will be sent to the units indicators.

As all of the relays HC, TC, UC and FC, Fig. 4, are now energized and locked to the line L" the circuit for the release relay RLS—2, Fig. 2, is completed over the line 55 and contacts 54, 67, 63 and 130 to ground. The release relay RLS—2 picks up and opens the locking circuits L' and L" causing all the relays in Figs. 2, 3, 4, 5 and 6 to release. The "high" and "last" indicators of stock number "348" now show the price 290, In the meantime, the HSN, TSN and USN groups, Fig. 1, have been set up under the control of the transmitter. The transmission may now proceed to the "no reset," "range," and the price digit groups as before. The release relay RLS—2, Fig. 2, causes the release of the relays E in Fig. 2 which in turn control the release of the release relay RLS—2. The price information may, therefore, be set up in the register groups, Fig. 2, immediately after the release relay RLS—2 has been normalized.

While the invention has been described with respect to certain particular preferred embodiments which give satisfactory results, it will be understood by those skilled in the art after understanding the invention, that various changes and modifications may be made without departing from the spirit and scope of the invention and it is intended therefore in the appended claims to cover all such changes and modifications.

What is claimed as new and desired to be secured by Letters Patent is:

1. The combination of a plurality of receiving mechanisms each comprising a plurality of groups of storage relays for storing information as to the stock number, range and price; means for effecting selection and a setting-up operation under control of said groups of relays, and means in each group of relays for normalizing the receiving mechanism at any stage of its operation.

2. The combination of electromagnetically operated indicators, impulsing means for sending impulses to the indicators, a counting chain for counting the impulses sent to the indicators, impulsing means for sending an impulse to the counting chain after an impulse has been sent to the indicators, cut-off relays adapted to be energized over circuits established by the counting chain to stop transmission to the indicators, a relay for applying battery to both of said impulsing means, and an impulsing means operable to energize said relay by an impulse terminating before the first mentioned impulsing means functions to transmit impulses to said indicators.

3. In a receiving mechanism comprising groups of relays, each group comprising four relays responsive to positive and negative impulses over two transmission channels, a common holding circuit for all of the relays of all of the groups, and a switching relay associated with each group for switching the transmission channels from an operated group to the next group, two of the relays in each group being operable simultaneously over said channels and locking directly to said holding circuit and the other two relays of each group locking to said holding circuit over the coil of the associated switching relay.

4. In a receiving mechanism, the combination of a group of two pairs of storage relays, two incoming transmission channels, means for causing one of said pairs of relays to energize in response to impulses over said channels of a chosen sign, means for causing the other pair of relays to respond to impulses for said channels of the opposite sign, and means under control of one of said pairs of relays for disconnecting said group of relays from said transmission channels.

5. In a stock quotation receiver, a group of registers, means for setting said registers in accordance with a desired combination of digits, a group of indicators corresponding to said registers, a sender, means for operating said sender to transmit impulses simultaneously to all the indicators which correspond to registers which have been set, a counting device controlled by said sender, and a single set of control contacts in said counting device common to all said registers for terminating the transmission of impulses to each indicator in accordance with the setting of the corresponding register.

6. A group of relays, a smaller number of transmission channels, means responsive to positive and negative impulses transmitted over said channels for energizing certain combinations of said relays simultaneously and other combinations successively to selectively prepare any one of a plurality of circuits, and means controlled by certain of said relays for removing the group of relays from the control by said energizing means, whereby any number of said relays may be energized by successive single or combinations of impulses.

7. In a receiving mechanism, the combination of a group of relays, a holding line for said relays, energizing lines adapted to be connected to the leads of said relays, transmission channels of a smaller number than the number of relays in the group, means responsive to positive and negative impulses transmitted over said channels for selectively energizing different combinations of said relays, a switching relay adapted to disconnect the energizing lines from said leads, means for establishing a holding circuit for certain of said combinations of relays directly to said holding line, and means for establishing a holding circuit for other of said combinations of relays across the coil of the switching relay to said holding line.

8. In a receiving mechanism, the combination of a group of storage relays, a normally grounded line, a plurality of lines adapted to be connected to the ground leads of said relays and adapted to be grounded to energize said relays, transmission channels of a smaller number than the number of relays in the group, means responsive to positive and negative impulses transmitted over said channels for selectively energizing different combinations of said relays, means operated by certain of said combinations of relays to complete a holding circuit from battery over the coil of said relays directly to said grounded line, a switching relay for disconnecting said plurality of lines from all of said leads, and means for closing a circuit from battery over the coils of certain other of said combinations of relays and said switching relay to said grounded line to cause energization of said switching relay upon removing ground from said other relays.

RAYMOND M. HICKS.
EVERETT R. LEROY.